United States Patent
Houjou

(10) Patent No.: US 9,100,678 B2
(45) Date of Patent: Aug. 4, 2015

(54) IMAGE DISPLAY METHOD, SERVER, AND IMAGE DISPLAY SYSTEM

(75) Inventor: Yoshiharu Houjou, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 207 days.

(21) Appl. No.: 13/418,602

(22) Filed: Mar. 13, 2012

(65) Prior Publication Data

US 2012/0249571 A1 Oct. 4, 2012

(30) Foreign Application Priority Data

Mar. 30, 2011 (JP) ................................. 2011-074927
May 24, 2011 (JP) ................................. 2011-115509
Aug. 29, 2011 (JP) ................................. 2011-185627

(51) Int. Cl.
*H04N 21/258* (2011.01)
*H04N 21/431* (2011.01)
*H04N 21/81* (2011.01)
*H04N 21/2743* (2011.01)

(52) U.S. Cl.
CPC ..... *H04N 21/25866* (2013.01); *H04N 21/2743* (2013.01); *H04N 21/4312* (2013.01); *H04N 21/8153* (2013.01)

(58) Field of Classification Search
None
See application file for complete search history.

(56) References Cited

U.S. PATENT DOCUMENTS

| | | | |
|---|---|---|---|
| 5,621,868 A | 4/1997 | Mizutani et al. | |
| 5,844,565 A * | 12/1998 | Mizutani et al. | 345/581 |
| 7,239,347 B2 | 7/2007 | Yamamoto et al. | |
| 7,522,195 B2 | 4/2009 | Yamamoto et al. | |
| 7,562,036 B2 * | 7/2009 | Smith et al. | 705/26.1 |
| 7,752,184 B2 | 7/2010 | Kagawa | |
| 8,041,612 B1 * | 10/2011 | Treyz et al. | 705/27.1 |
| 8,732,175 B2 | 5/2014 | Butterfield et al. | |
| 2002/0033848 A1 | 3/2002 | Sciammarella et al. | |
| 2006/0039609 A1 * | 2/2006 | Takano | 382/190 |
| 2006/0192881 A1 * | 8/2006 | Sato et al. | 348/333.05 |
| 2007/0245260 A1 * | 10/2007 | Koppert | 715/784 |
| 2008/0159708 A1 | 7/2008 | Kazama et al. | |
| 2008/0301583 A1 * | 12/2008 | Akagi | 715/838 |
| 2009/0106699 A1 | 4/2009 | Kihara et al. | |
| 2010/0057555 A1 * | 3/2010 | Butterfield et al. | 705/14.41 |
| 2010/0277496 A1 * | 11/2010 | Kawanishi et al. | 345/589 |

(Continued)

FOREIGN PATENT DOCUMENTS

| | | |
|---|---|---|
| CN | 1641742 A | 7/2005 |
| CN | 101305390 A | 11/2008 |

(Continued)

OTHER PUBLICATIONS

Japanese Office Action dated Jun. 18, 2013 (and English translation thereof) in counterpart Japanese Application No. 2011-287267.

(Continued)

*Primary Examiner* — Xiao Wu
*Assistant Examiner* — Steven Elbinger
(74) *Attorney, Agent, or Firm* — Holtz, Holtz, Goodman & Chick PC

(57) ABSTRACT

An image display method comprises uploading images from a terminal of users to a server via a network, storing the images uploaded by the users in the server, calculating a value of the stored images, displaying a predetermined number of images among the stored images at the terminal in a manner in accordance with the value of the images.

6 Claims, 17 Drawing Sheets

(56) References Cited

U.S. PATENT DOCUMENTS

| 2011/0050726 | A1 | 3/2011 | Suehiro |
| 2011/0081088 | A1* | 4/2011 | Xiao ............................ 382/218 |
| 2011/0225153 | A1 | 9/2011 | Haseyama |
| 2012/0317110 | A1 | 12/2012 | Butterfield et al. |

FOREIGN PATENT DOCUMENTS

| CN | 101419612 A | 4/2009 |
| JP | 1-46905 B2 | 10/1989 |
| JP | 8-44867 A | 2/1996 |
| JP | 09259130 A | 10/1997 |
| JP | 2002027085 A | 1/2002 |
| JP | 2004139343 A | 5/2004 |
| JP | 2004-186830 A | 7/2004 |
| JP | 2004-213598 A | 7/2004 |
| JP | 2005055743 A | 3/2005 |
| JP | 2007-034663 A | 2/2007 |
| JP | 2007141092 A | 6/2007 |
| JP | 2007-174267 A | 7/2007 |
| JP | 2008167082 A | 7/2008 |
| JP | 2008-242639 A | 10/2008 |
| JP | 2009-020836 A | 1/2009 |
| JP | 2009-181262 A | 8/2009 |
| JP | 2010-152777 A | 7/2010 |
| JP | 2011-055190 A | 3/2011 |
| WO | 2010/053160 A1 | 5/2010 |

OTHER PUBLICATIONS

Japanese Office Action dated Apr. 23, 2013 (and English translation thereof) in counterpart Japanese Application No. 2011-185627.
Chinese Office Action dated Mar. 27, 2014 in counterpart Chinese Application No. 201210085601.8.
Japanese Office Action dated Feb. 24, 2015 issued in counterpart Japanese Application No. 2013-187816.
Japanese Office Action dated Apr. 22, 2014 issued in counterpart Japanese Application No. 2013-126266.

* cited by examiner

IMAGE DISPLAY METHOD, SERVER, AND IMAGE DISPLAY SYSTEM

CROSS-REFERENCE TO RELATED APPLICATIONS

This application is based upon and claims the benefit of priority from prior Japanese Patent Applications No. 2011-074927, filed Mar. 30, 2011; No. 2011-115509, filed May 24, 2011; and No. 2011-185627, filed Aug. 29, 2011, the entire contents of all of which are incorporated herein by reference.

BACKGROUND OF THE INVENTION

1. Field of the Invention

The present invention relates to an image display method and an image display system in which a server and a terminal are connected via a network to display an image stored in the server.

2. Description of the Related Art

In recent years, how to enjoy photos has diversified with widespread use of digital cameras. Various kinds of image processing are enabled by making good use of properties of digital image data.

For example, a technology capable of displaying a video similar to an ordered artwork is proposed (see, for example, Jpn. Pat. Appln. KOKAI Publication No. 8-44867). In this publication, a technique used to produce the ordered artwork is simulated. An automatic video processing is performed so as to produce video having a preferred appearance of ordered artwork and comfortable to consumers desiring decorative artworks. A corrected video is derived by lowering precision of the original video. The corrected video is added to the original video.

Also, a technology that takes an entire original image into consideration to make a conversion into a painting image of high artistic quality by developing the technology of Jpn. Pat. Appln. KOKAI Publication No. 8-44867 is proposed (see, for example, Jpn. Pat. Appln. KOKAI Publication No. 2004-213598). Color information and characteristics such as brush touch information are extracted from images of paintings actually drawn by painters. The extracted characteristics are added to a shot image.

Also, a technology allowing a selection of various images by changing the shape of an element figure, which is the unit of transfer, or the density or order of points on which transfer processing is performed is proposed (see, for example, Jpn. Pat. Appln. KOKOKU Publication No. 1-046905).

A powerful image processing engine is needed to make such image conversions and thus, installing an image processing engine on a server in a network to allow a user to upload a photo of the user to the server for image processing such as a snapshot-to-painting conversion on the server can be considered.

In such a case, if the user produces an artwork by snapshot-to-painting conversion of the user's photo, he (she) wants to show the artwork to others. One method of satisfying such a desire is posting a photo on a network by a social network service (see, for example, Jpn. Pat. Appln. KOKAI Publication No. 2008-242639).

An image obtained after a photo of a user being uploaded to a server by the user and image processing such as a snapshot-to-painting conversion being performed thereon will be called an "artwork" below.

If many users post a large quantity of artworks on a server, the number of artworks that can be displayed at a time is limited and a problem of deteriorating properties of browsing such arts is caused.

BRIEF SUMMARY OF THE INVENTION

An object of the present invention is to provide an image display method, a server, and an image display system that display an image stored in the server via a network efficiently so as to attract attention of users.

According to the invention, an image display method comprises uploading images from a terminal of users to a server via a network; storing the images uploaded by the users in the server; calculating a value of the stored images; displaying a predetermined number of images among the stored images at the terminal in a manner in accordance with the value of the images.

According to the present invention, the images stored in the server can be displayed efficiently so as to attract attention of users.

DETAILED DESCRIPTION OF THE INVENTION

The embodiments of the present invention will be described below with reference to drawings.

First Embodiment

Figure 1:
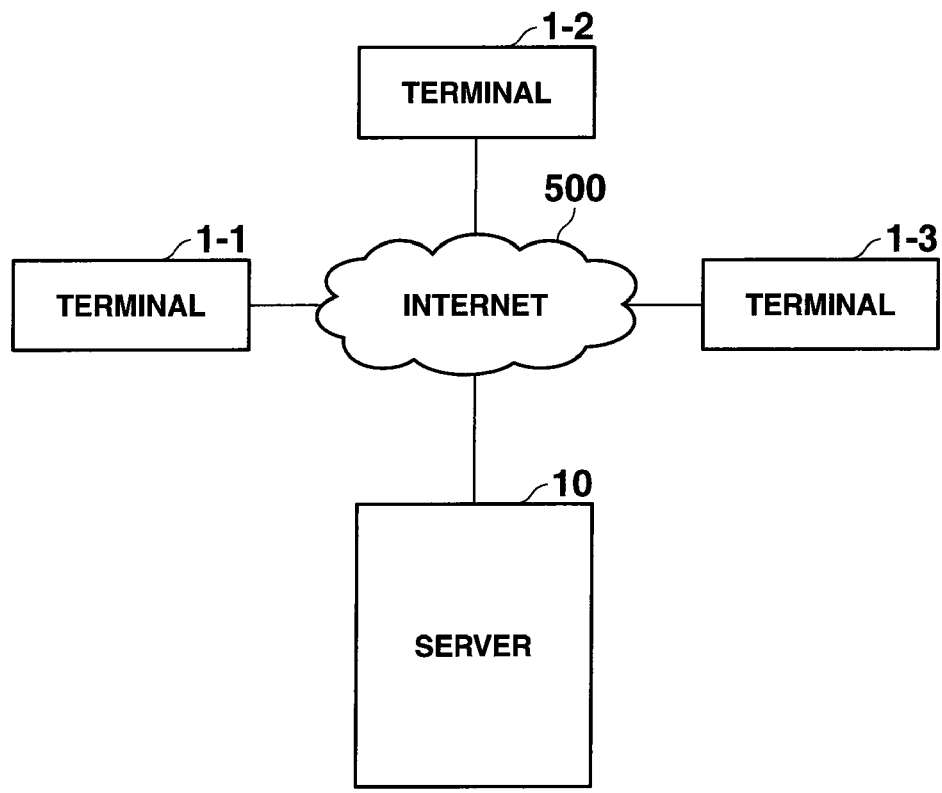
FIG. 1 is a block diagram showing the configuration of a network of an image display system according to embodiments.

FIG. 1 is a block diagram showing the configuration of a network of an image display system common to all embodiments of the present invention. A server 10 with a social network service function is located at an image service site. A plurality of terminals 1-1, 1-2, 1-3, . . . are connected to the server 10 via a network such as an Internet 500. The terminal may be an ordinary personal computer or mobile phone.

The server 10 stores image data (mainly image data of a photo shot by a digital camera) uploaded from a user via the terminals 1-1, 1-2, 1-3, . . . , converts the uploaded image into painting image, and also allows other users to browse the uploaded image and the converted painting image.

Figure 2:
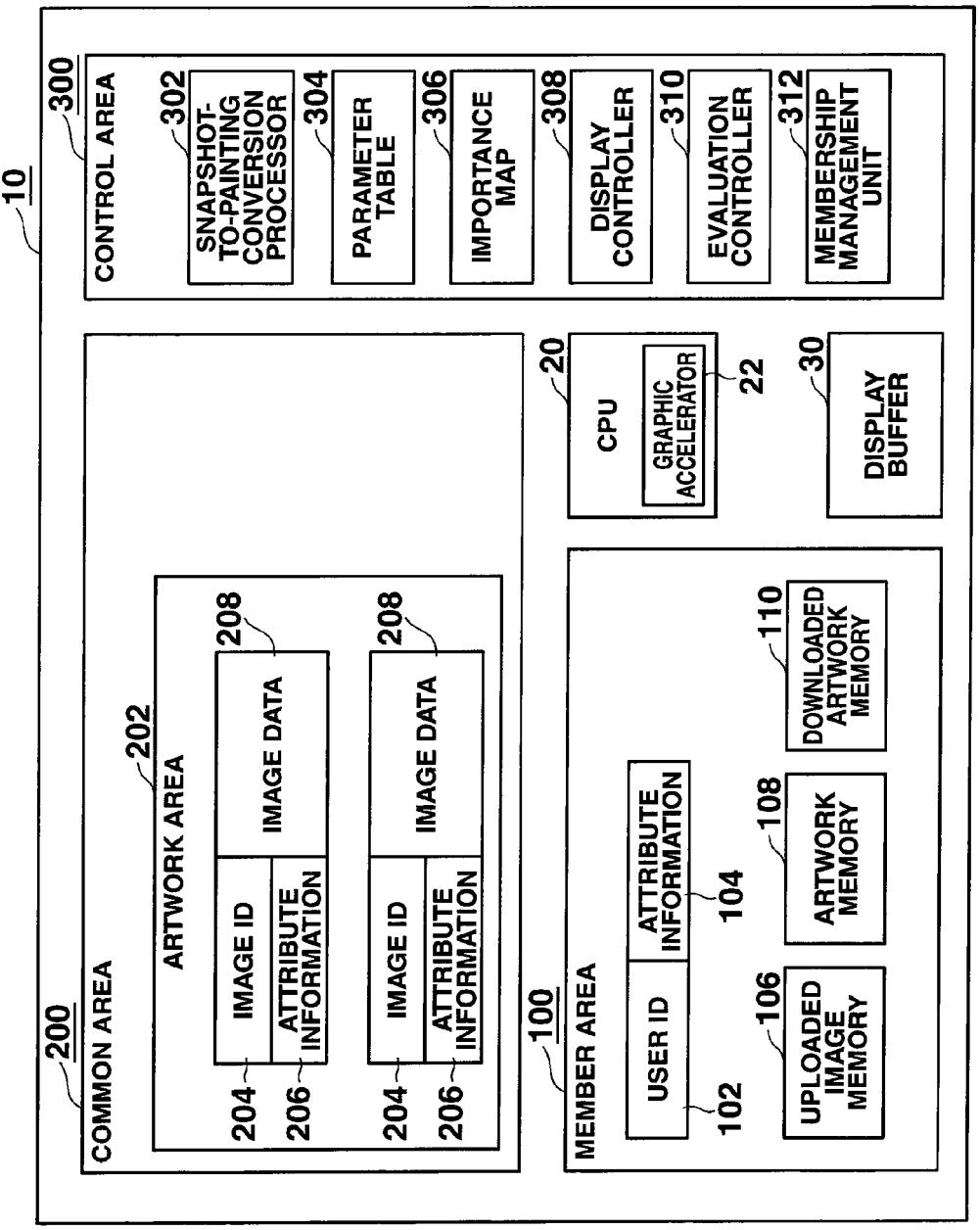
FIG. 2 is a block diagram showing an outline configuration of a server of the embodiments.

FIG. 2 is a block diagram showing principal portions in the configuration of the server 10. The server 10 is provided with a member area 100, a common area 200, and a control area 300.

The member area 100 is an area provided for each registered member and stores a user ID 102 to identify each member and various kinds of attribute information 104 for each user corresponding thereto.

Figure 3:
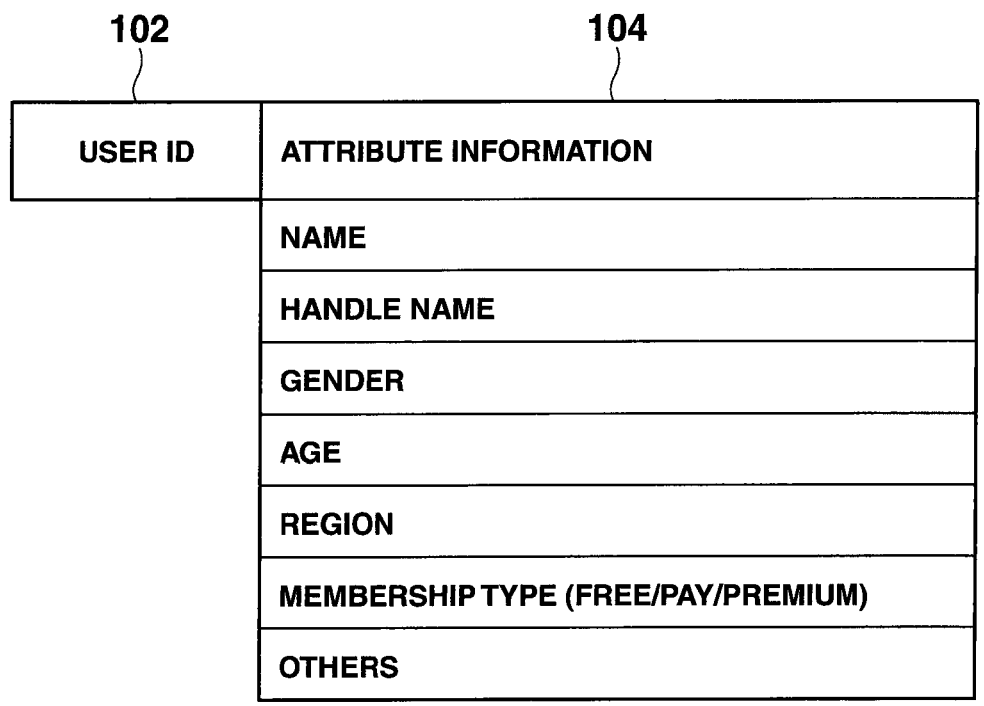
FIG. 3 is a diagram showing an example of attribute information of a user ID.

The attribute information 104 is, as shown in FIG. 3, user-specific information including the name, handle name, gender, age, region, membership type, and others. The membership type includes a free member registered without charge, a pay member registered on a chargeable basis, and a premium member who pays a special membership fee (for example, an annual membership fee).

The member area 100 includes an uploaded image memory 106 which stores image data of photos uploaded by the user, an artwork memory 108 which stores painting images (artworks) obtained through snapshot-to-painting conversion by the server 10, and a downloaded artwork memory 110 which stores artworks of other users downloaded from the other users.

The common area 200 is an area provided commonly to all users and includes an artwork area 202 which stores many artworks obtained by snapshot-to-painting conversion of images uploaded by the users.

Each artwork stored in the artwork area 202 has image data 208 stored together with an image ID 204 to identify the artwork and attribute information 206 of the artwork.

Figure 4:
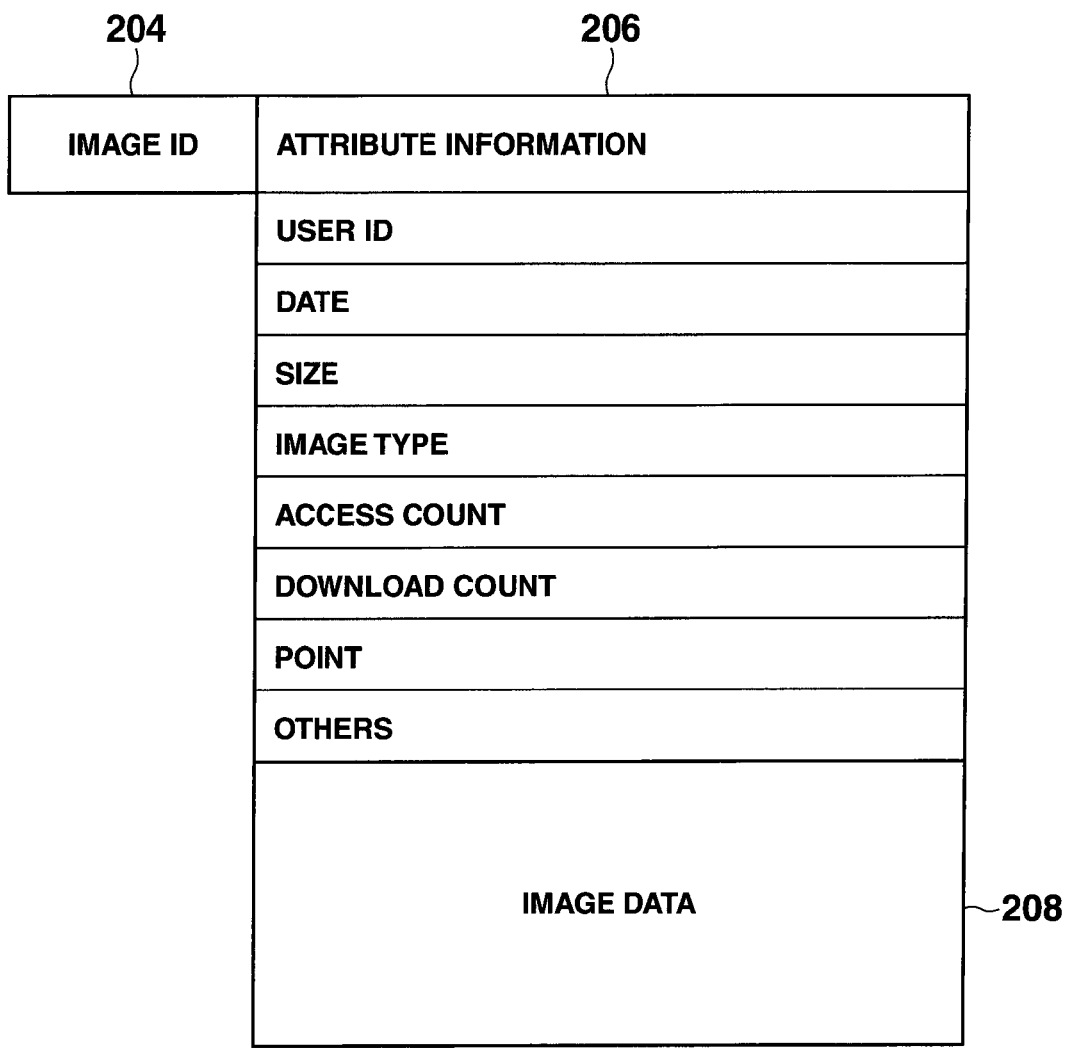
FIG. 4 is a diagram showing an example of attribute information of an image ID.

The attribute information 206 includes, as shown in FIG. 4, the user ID indicating a contributor of the artwork, date information such as the creation date or posting date, size of image data, image type information such as the type of painting tone, access count information indicating the number of times the artwork is browsed, download count information indicating the number of times the artwork is downloaded, point information indicating evaluation of the artwork, and other information specific to artworks. The creator of the artwork is known from the user ID and whether the creator is a pay member or premium member can be identified.

In the present embodiment, artworks are not displayed uniformly and instead, the display manner can be changed based on the "value" thereof. Examples of the value include the point number, which is attribute information attached to each artwork, access count, and download count, and the membership type of the creator of each artwork.

The control area 300 includes a snapshot-to-painting conversion processor 302, a parameter table 304, an importance map 306, a display controller 308, an evaluation controller 310, and a membership management unit 312.

The snapshot-to-painting conversion processor 302 performs snapshot-to-painting conversion processing that converts image data stored in the artwork memory 108 into painting image data. The parameter table 304 stores parameters for snapshot-to-painting conversion referenced by the snapshot-to-painting conversion processor 302 to perform the snapshot-to-painting conversion processing. The display controller 308 stores a control program that causes a screen to display artworks.

The evaluation controller 310 evaluates artworks stored in the artwork memory 108 of the member area 100 based on the access count or the like and attaches a point to each artwork. The membership management unit 312 manages members based on the user ID and controls services separately for free members, pay members, and premium members. The membership management unit 312 also administers the social network service function of the server 10.

The server 10 is provided with a CPU 20 and a display buffer 30. The CPU 20 controls the whole server 10 (each unit described above) and also performs various kinds of processing needed to display many artworks at a glance on the Internet.

The CPU 20 also includes a graphic accelerator 22 to perform advanced graphic processing. As the graphic accelerator 22, for example, the NVIDIA GeForce (registered trademark) series, ATi RADEON (registered trademark), or open GL and extended libraries to use the open GL may be adopted.

The graphic accelerator 22 enables the time line display in which images are caused to display like a flow over time by specifying only some conditions from driver software. Generally in video editing, the time line display is a function to manage the flow of a whole artwork in a time sequence and in Twitter (registered trademark), the time line display refers to tweets posted by users and displayed in the order of time sequence, but the time line display herein means displaying the flow of the whole artwork by changing the flow over time.

The display buffer 30 is a work memory to generate images for the display when the CPU 20 causes a display screen to display many artworks at a glance.

Concrete operations of an image display system according to the present embodiment will be described below with reference to flow charts.

Figure 5:
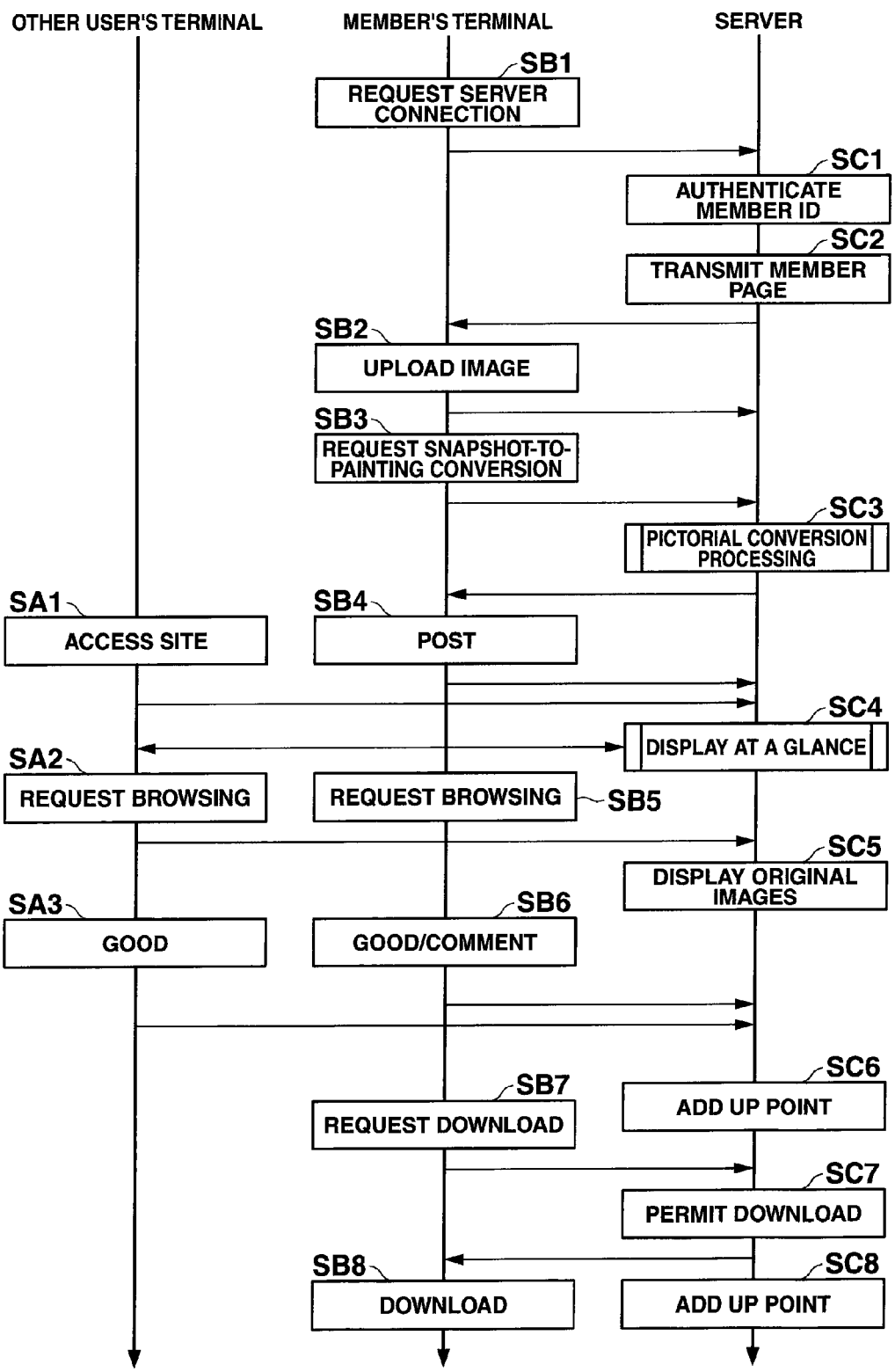
FIG. 5 is a flow chart to exchange data between a terminal and the server.

First, processes when an image is uploaded, displayed, browsed, and downloaded between the terminals 1-1, 1-2, 1-3, . . . and the server 10 on an image service site will be described with reference to FIG. 5.

If the user is a member (a free member, pay member, or premium member), the user accesses the server 10 from the terminal of the user (step SB1). The server 10 authenticates the user ID after the user being logged in (step SC1) and, if it is verified that the user is a member, sends a page of the member so that the user can view the page (step SC2).

When the page of the member is opened, the member uploads an image (step SB2). The uploaded image is stored in the uploaded image memory 106 of the member area 100 of the server. If the member request a snapshot-to-painting conversion of the image (step SB3), the server 10 performs the snapshot-to-painting conversion processing (or pictorial conversion processing) (step SC3) and the converted image, that is, the artwork is stored in the artwork memory 108.

The member may personally enjoy the converted artwork, but may post the artwork if the artwork is desired to be released to other users (step SB4). The posted artwork is transferred from the artwork memory 108 of the member area 100 to the artwork area 202 of the common area 200 and stored there. Incidentally, the attribute information 206 as described with reference to FIG. 4 is attached each artwork in the artwork area 202.

The server 10 displays artworks in the artwork area 202 at a glance if necessary (step SC4). Incidentally, the server 10 resizes artworks in the artwork area 202 when displaying artworks at a glance if appropriate. That is, because the size of artworks in the artwork area 202 is normally larger than the image size for display at a glance, the artworks are reduced and if the size of artworks in the artwork area 202 is smaller than the image size for display at a glance, the artworks are enlarged.

The member can browse any artwork displayed at a glance in an actual size by making a request of browsing (step SB5). If a browsing request is made, the server 10 displays the requested artwork in the actual size (step SC5) and also adds up a point to the artwork whose browsing is requested (step SC6).

The member may press a GOOD button displayed in the page of the member and indicating that the browsed artwork suits his (her) taste or write a comment such as his (her) impressions (step SB6). If the GOOD button is pressed or a comment such as impressions is written, the server 10 adds up a point to the browsed artwork (step SC6). The evaluation of the artwork is thereby raised. It is assumed that the point number of comment writing is higher than the point number of the GOOD button.

The member can also request a download of a browsed artwork (step SB7). If a download request is made by a member, the server 10 permits the download if necessary (step SC7) and the member can download a browsed artwork only if the download is permitted (step SB8). The downloaded artwork is stored in the downloaded artwork memory 110 of the member area 100.

If a download request is made, the server 10 also adds up a point to the artwork (step SC8).

On the other hand, other users other than members, that is, any user can browse artwork stored in the artwork area 202 of the common area 200 in a state of the display at a glance by appropriately accessing the server 10 (step SA1). Further, any user can also browse any artwork displayed at a glance in the actual size by making a request of browsing (step SA2).

Then, if any user presses the GOOD button because the browsed artworks suits his (her) taste (step SA3), the server 10 also adds up a point to the browsed artwork (step SC6).

Next, the technology of snapshot-to-painting conversion processing when the server 10 converts uploaded image data into a painting image will be described.

The snapshot-to-painting conversion is an image processing technology to convert each pixel constituting an original image such as a photo to an artwork according to predetermined parameters (snapshot-to-painting conversion parameters). The artwork includes an oil painting, thick oil painting, gothic oil painting, fauvist oil paining, water color painting, gouache painting, pastel painting, color pencil sketch, pointilism, silkscreen, drawing, and air brush.

The technology of snapshot-to-painting conversion image processing converts an original image to an image looking like a painting basically by automatically adjusting/combining parameters of various kinds of effect processing known as photo retouch software.

Effect processing includes, for example, texture processing that provides a special texture by mapping the texture to an image and resolution processing that increases the texture and resolution by dividing an image into a contour portion, a texture portion such as a fine pattern, and a flat portion and performing appropriate processing on each portion. The effect processing also includes HSV processing that adjusts the color by dividing the color into three elements of the hue, saturation, and value, RGB processing that adjusts the degree of each color of R (red), G (green), and B (blue), and RGB substitution processing that makes a substitution in the direction of R to G, G to B, and B to R. The effect processing also includes an edge extraction processing that applies a filter called a Laplacian filter and an intermediate density extraction processing that applies a filter called a median filter. The effect processing also includes a density extraction processing that performs processing when a histogram in RGB of adjacent pixels is extracted to extract minimum/intermediate/maximum densities, an equalize processing that corrects the contrast or enlarges an image's histogram by setting the darkest portion of an image as black, the brightest portion as white, and appropriately distributing a histogram therebetween, a gamma correction processing that adjusts an intermediate brightness while maintaining a bright portion and a dark portion, and a shadow processing that brightens a dark portion of an image or darkens a bright portion thereof. The effect processing also includes a solarization processing that when the RGB value of each pixel is brighter than a threshold, inverts the RGB value thereof and a noise addition processing that adjusts the quantity and color of noise by randomly drawing dots to cause noise.

The effect processing also includes an effect processing called HDR (High Dynamic Range) in which a photo with a wide dynamic range that cannot be expressed by an ordinary photo is compressed into a narrow dynamic range width through tone mapping to correct whiteout due to overexposure and black crushing due to underexposure so that power of expression is increased. By applying this effect processing, an image realizing a new photo expression that brings a photo closer to memories or impressions a person's brain has received and adds an artistic expression can be obtained.

That is, the snapshot-to-painting conversion processing is in principle a kind of effect processing and a snapshot-to-painting conversion algorithm creates various kinds of painting tone by appropriately combining effect processing and parameters and is programmed as the snapshot-to-painting conversion processing.

In the conversion algorithm, a parameter group P, which is a set of the parameters to convert pixels of an original image, is prepared in advance. If there are 12 kinds of painting tones, parameter groups are represented as P1 to P12. How to determine parameters also changes the tone of a converted image. If the parameter group for the conversion into an oil painting tone is P1 and there are m parameters in P1 needed for effect processing to convert an image so as to look like a painting tone image, the parameter group P1 contains a plurality of parameters $P1_1$ to $P1_m$.

The snapshot-to-painting conversion algorithm described above in detail is stored in the snapshot-to-painting conversion processor 302 of the control area 300 of the server 10 and parameter groups are similarly stored in the parameter table 304 of the control area 300.

Figure 6:
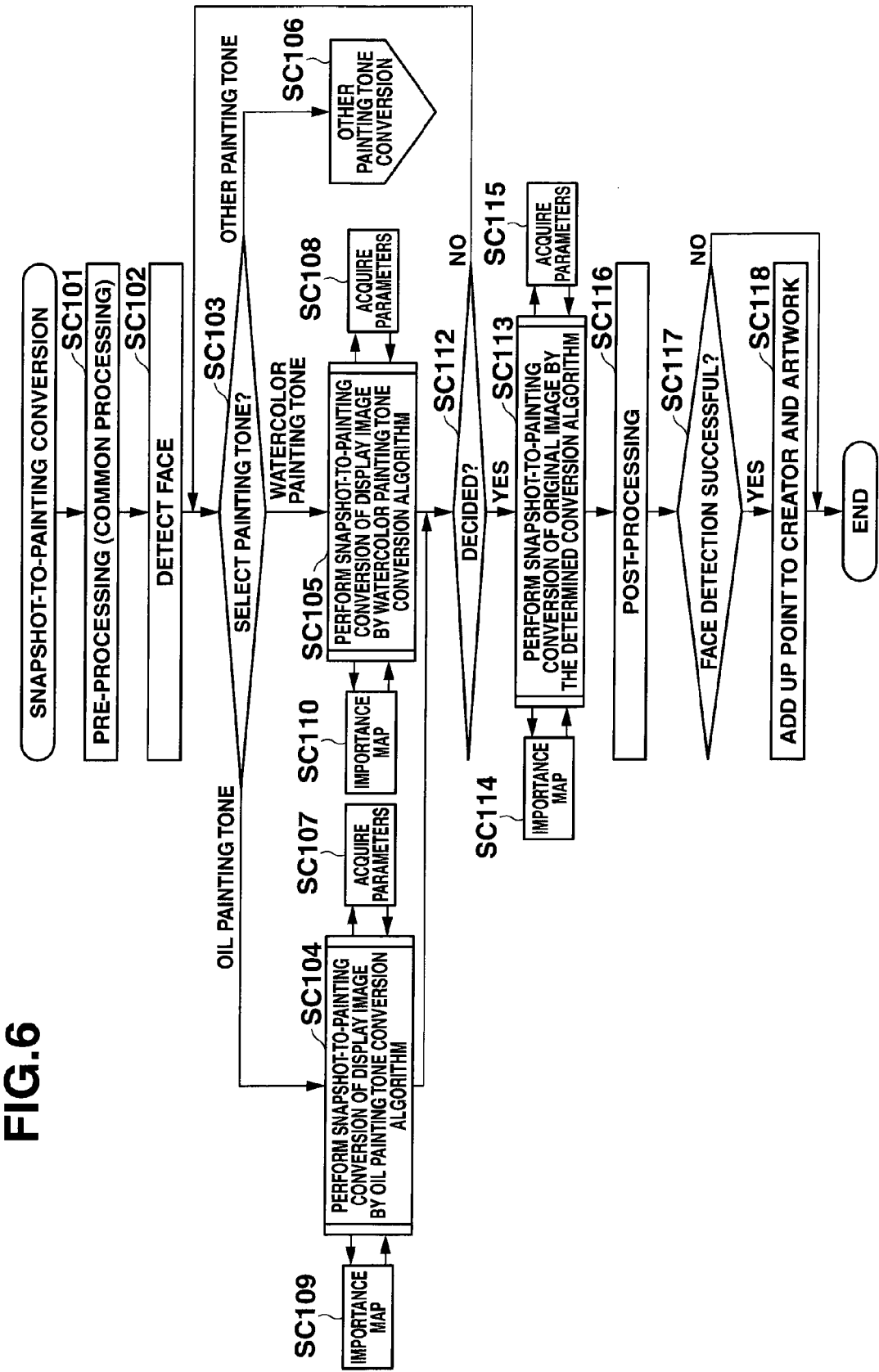
FIG. 6 is a flow chart illustrating snapshot-to-painting conversion on the server.

FIG. 6 is a flow chart for performing snapshot-to-painting conversion processing by the snapshot-to-painting conversion processor 302 of the server 10. As shown in FIG. 6, the snapshot-to-painting conversion processor 302 first performs pre-processing (step SC101). This step is processing performed commonly regardless of the type of painting tone. The effect processing described above is performed on each pixel and thus, image data needs to be in bitmap format. Thus, image data normally in JPEG format is converted into the bitmap format.

In addition, uploaded image data has various sizes and thus, the snapshot-to-painting conversion processor 302 resizes the image data to the number of pixels in the display area, for example, 800×600 pixels. A large image is reduced and a small image is enlarged. This is because if the size is determined, parameters only need to be fixed and processing is more efficient. Needless to say, when a snapshot-to-painting conversion of an original image described later is made, the snapshot-to-painting conversion occurs in the size in which image data is uploaded.

Next, the snapshot-to-painting conversion processor 302 performs face detection processing to determine whether the photo to be converted contains any face (step SC102). This is because if an extreme conversion of a face portion is made, the converted image may be unnatural and thus, particularly finer snapshot-to-painting conversion processing is performed on the face portion.

In the face detection processing, as will be described later by using the flow chart in FIG. 7, importance changes even in an image between a face region and the background or between a center portion and a peripheral portion and thus, importance map data is created for the image and stored in the importance map 306 of the control area 300.

Subsequently, the snapshot-to-painting conversion processor 302 causes the user to select the desired painting tone from the oil painting, thick oil painting, gothic oil painting, fauvist oil paining, water color painting, gouache painting, pastel painting, color pencil sketch, pointilism, silkscreen, drawing, and air brush (step SC103).

If the painting tone is selected, the snapshot-to-painting conversion processor 302 proceeds to the flow of each painting tone conversion algorithm. If, for example, the oil painting tone is selected, the snapshot-to-painting conversion processor 302 proceeds to step SC104 and if the watercolor painting tone is selected, the snapshot-to-painting conversion processor 302 proceeds to step SC105. Otherwise, the snapshot-to-painting conversion processor 302 proceeds to the flow of other painting tone conversion algorithms (step SC106). Incidentally, when executing each algorithm, the snapshot-to-painting conversion processor 302 references the parameter table 304 and the importance map 306 of the control area 300 (steps SC107, SC108, SC109, SC110).

In the processing in steps SC104, SC105, SC106, the snapshot-to-painting conversion processor 302 makes a snapshot-to-painting conversion intended for image data of the display screen size. If a decision is instructed from the terminal 1-1 of the user (step SC112: YES), proceeds to the snapshot-to-painting conversion of the original image (step SC113) and, if redoing in another painting tone is instructed (step SC112: NO), returns to the processing in step SC103.

For the snapshot-to-painting conversion of the original image in step SC113, the snapshot-to-painting conversion processor 302 performs painting tone conversion processing on the original image based on the painting tone conversion algorithm determined in step SC112 while referencing the parameter table 304 and the importance map 306 (steps SC114, SC115). If the image sizes are different, appropriate parameters are different even if the painting tone is the same and thus, the parameter table used in step SC115 is different from parameters used in step SC107 or SC108.

Then, the snapshot-to-painting conversion processor 302 performs post-processing to convert the converted original image back to the JPEG format (step SC116).

Subsequently, if any person's face is successfully detected in the photo to be converted in the face detection processing in step SC102 (step SC117: YES), the snapshot-to-painting conversion processor 302 causes the evaluation controller 310 to add up a point to each of the creator of the artwork and the artwork (step SC118).

Next, the face detection processing in step SC102 by the snapshot-to-painting conversion processor 302 described above and a procedure for creating an importance map will be described with reference to FIGS. 7 to 10.

Figure 7:
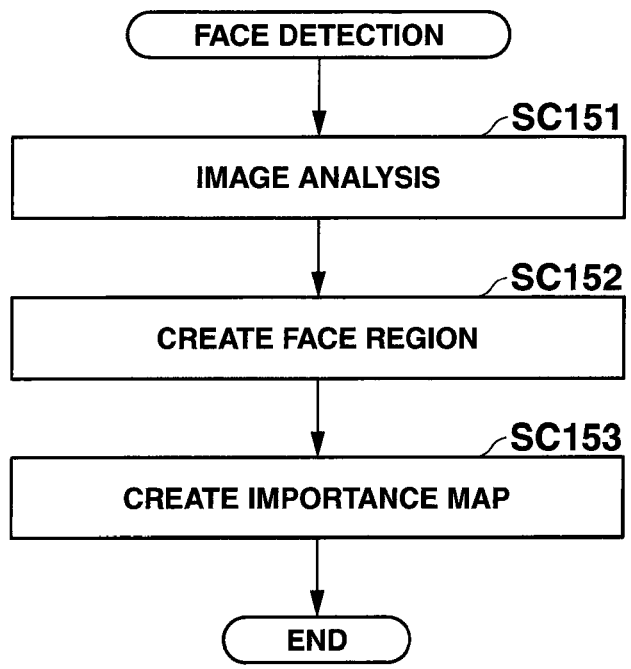
FIG. 7 is a flow chart illustrating face detection in the snapshot-to-painting conversion.

In the face detection processing, as shown in FIG. 7, the snapshot-to-painting conversion processor 302 first analyzes the target image data to determine whether there is any face therein (step SC151). Any known face detection technology can be used and thus, a detailed description thereof is omitted. In the face detection processing, even if a face is detected, it is difficult to accurately extract the contour thereof and thus, the snapshot-to-painting conversion processor 302 sets an elliptic or rectangular region containing a face region to the image data (step SC152).

Figure 8:
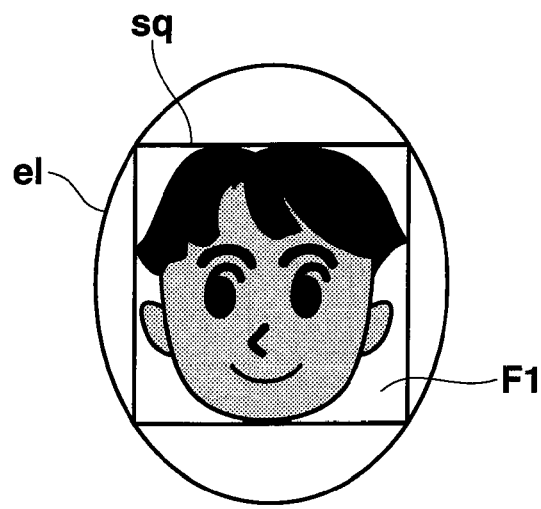
FIG. 8 is a diagram illustrating creation of a face region.

FIG. 8 is a diagram illustrating a region containing a face region. A rectangular region "sq" contains a face F1 and an elliptic region "e1" contains the face F1.

Figure 9A:
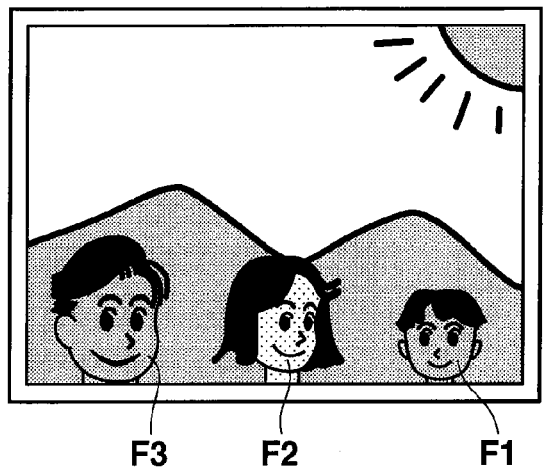
FIGS. 9A, 9B, and 9C are diagrams illustrating an importance map.
Figure 9B:
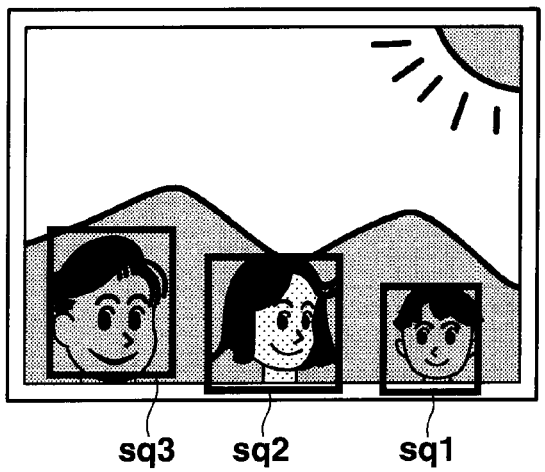
Figure 9C:
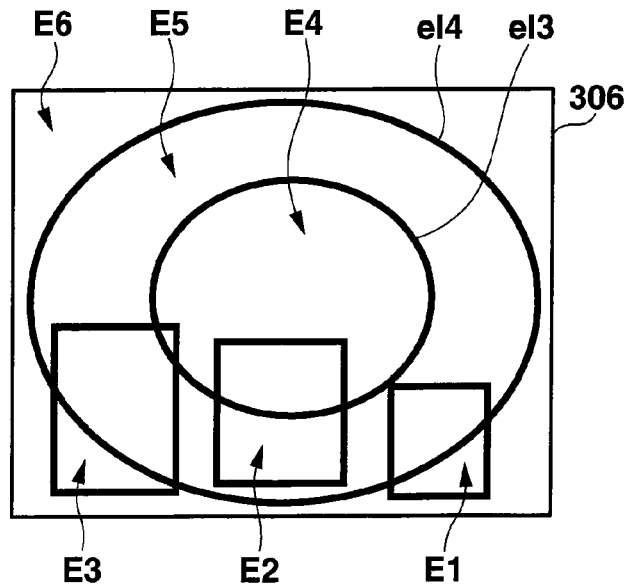

Then, the snapshot-to-painting conversion processor 302 creates an importance map (step SC153). FIGS. 9A to 9C are diagrams illustrating the importance map. In the processing in step SC153, if the snapshot-to-painting conversion processor 302 detects faces F1, F2, F3 from image data as shown in FIG. 9A, the snapshot-to-painting conversion processor 302 sets face regions sq1, sq2, sq3 as shown in FIG. 9B to the image data.

FIG. 9C is an important map 306 showing the importance of regions set to the image data. In the processing in step SC153, the snapshot-to-painting conversion processor 302 first sets the first importance level to regions E1, E2, E3 of the face regions sq1, sq2, sq3. Next, the snapshot-to-painting conversion processor 302 sets the second importance level to a region E4 in the center indicated by an ellipse e13. Further, the snapshot-to-painting conversion processor 302 sets the third importance level to a region E5 in a background portion indicated by an ellipse e14. Lastly, the snapshot-to-painting conversion processor 302 sets the lowest importance level to a peripheral portion E6.

That is, each region E1 to E6 and information indicating the importance level set to each region E1 to E6 shown in FIG. 9C become an importance map.

Then, when performing snapshot-to-painting conversion processing on each pixel of image data, the snapshot-to-painting conversion processor 302 makes a finer snapshot-to-painting conversion on a region of increasing importance level and a more coarse snapshot-to-painting conversion on a region of decreasing importance level. As a result, the snapshot-to-painting conversion of the region E6 of the peripheral portion whose importance level is the lowest becomes somewhat blurred. Needless to say, this is only an example and it is also possible not to apply the snapshot-to-painting conversion processing to the face regions E1, E2, E3 so that the atmosphere of the faces is not damaged.

If the importance level is denoted by $\alpha(x, y)$ ($\alpha$ has the same number of pixels as image data), conversion operations of a pixel A are given by:

$$A_{RGB}(x,y) = A_{RGB}(x,y) \times P_1 \times \alpha(x,y)$$

$$A_{RGB}(x,y) = A_{RGB}(x,y) \times P_2 \times \alpha(x,y)$$

$$A_{RGB}(x,y)=A_{RGB}(x,y)\times P_m\times \alpha(x,y)$$

Where (x, y) denotes two-dimensional coordinates and $A_{RGB}$ denotes three components R, G, B of the pixel A. That is, the importance level of the parameters $P_1, P_2, \ldots, P_m$ changes depending on the value of $\alpha$.

Incidentally, instead of providing the importance level $\alpha$ for the same number of pixels as image data, only six kinds of importance data may be prepared by setting the same importance level to each area of E1 to E6. Instead of only six kinds, overlapping areas may be a little more fragmented by setting an intermediate value of importance.

Figure 10:
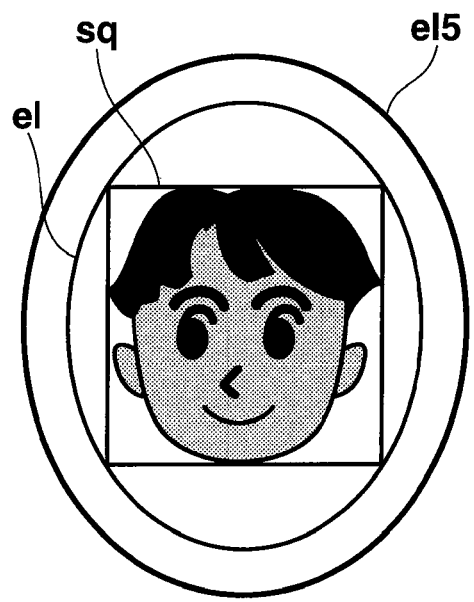
FIG. 10 is a diagram illustrating a boundary of the face region.

FIG. 10 shows further fragmentation of the region of the contour portion of the face region shown in FIG. 8. If the importance level is changed inside and outside the contour of the face region, a difference in conversion may arise in a converted painting image and thus, as illustrated in FIG. 10, the importance level set to the peripheral region of the face region is increased (decreased) in the order of sq>e1>e15. In this manner, the snapshot-to-painting conversion of the contour portion of the face can be made stepwise in a more natural way.

Next, the operation of the server 10 when the user downloads an optional artwork will be described. Incidentally, membership registration is needed to download an artwork.

Figure 11:
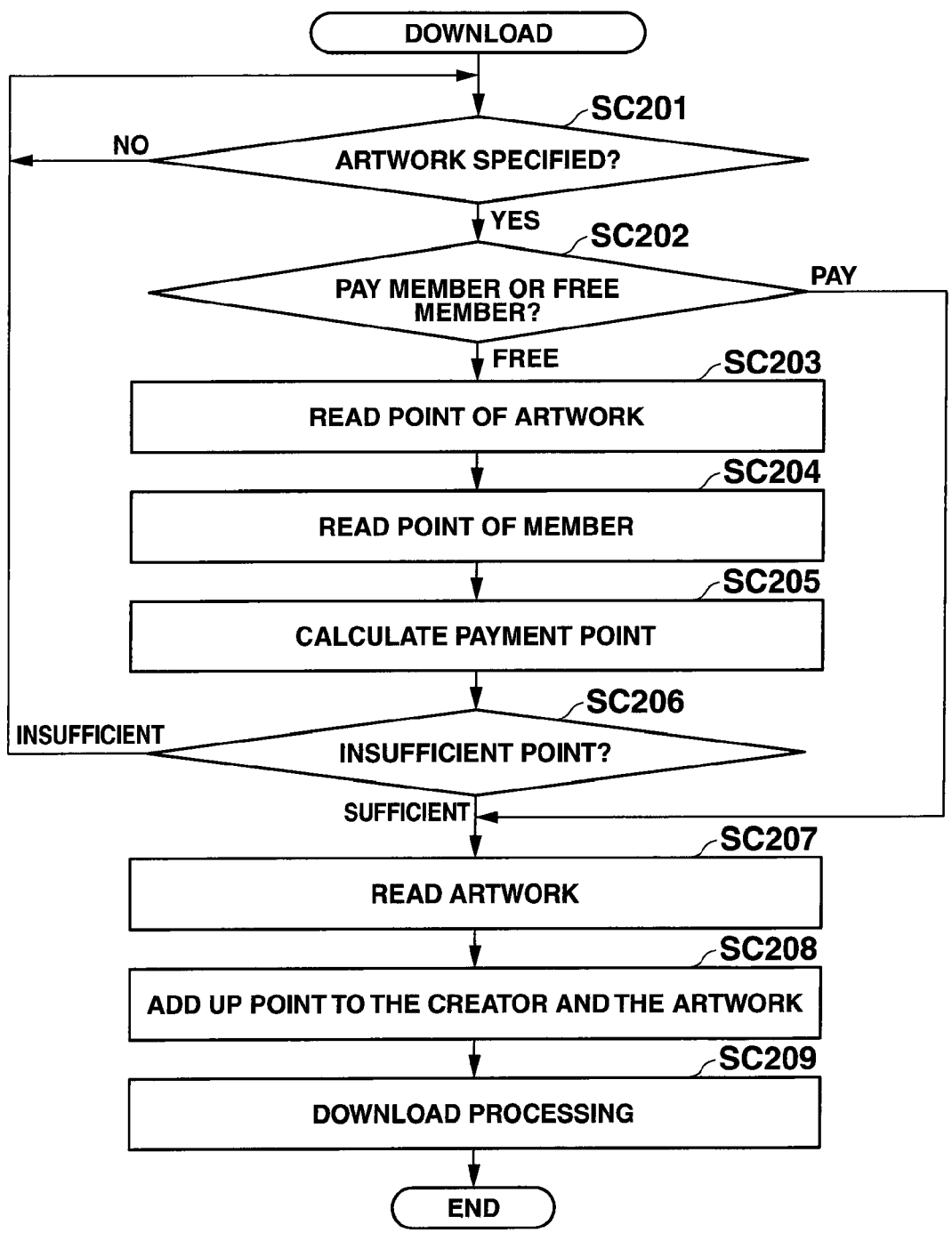
FIG. 11 is a flow chart showing processing concerning a download of an artwork on the server.

FIG. 11 is a flow chart showing processing concerning a download of an artwork on the server 10. The processing in FIG. 11 is performed by the CPU 20 of the server 10, the evaluation controller 310, and the membership management unit 312.

If the artwork desired by a member to download is specified on the server 10 (step SC201), the membership management unit 312 determines whether the user is a pay member (here, an ordinary pay member or a premium member) or a free member (step SC202). If the user is a pay member, immediately proceeds to step SC207 described later.

On the other hand, the user is a free member, the membership management unit 312 reads the point corresponding to the evaluation of the artwork from the attribute information 206 of the artwork (step SC203) and also reads the point held by the member who is about to download from the attribute information thereof (step SC204).

Next, the membership management unit 312 calculates a payment point from the balance of the point (corresponding to the evaluation) of the artwork and the point held by the member (step SC205). If the payment point is sufficient (step SC206; Sufficient), the membership management unit 312 proceeds to step SC207. But if the payment point is insufficient (step SC206; Insufficient), the artwork cannot be downloaded and the membership management unit 312 returns to step SC201 to cause the user to select another artwork.

Then, on the server 10, the CPU 20 reads the artwork specified by the user from the artwork memory 108 of another user who is the creator of the artwork (step SC207) and the evaluation controller 310 adds up a point to each of the creator of the artwork and the artwork (step SC208). That is, things are arranged for members (free members, pay members, and premium members) so that the evaluation of artworks rises with an increasing number of downloads of members' artworks and also a point is added to the point area in the attribute information of the user ID 206 of the member who is the creator, which increases the points held by the member.

Then, on the server 10, the CPU 20 performs download processing that stores the artwork, read in step SC207 in the downloaded artwork memory 110 of the user who has requested the download thereof (step SC209).

Figure 12:
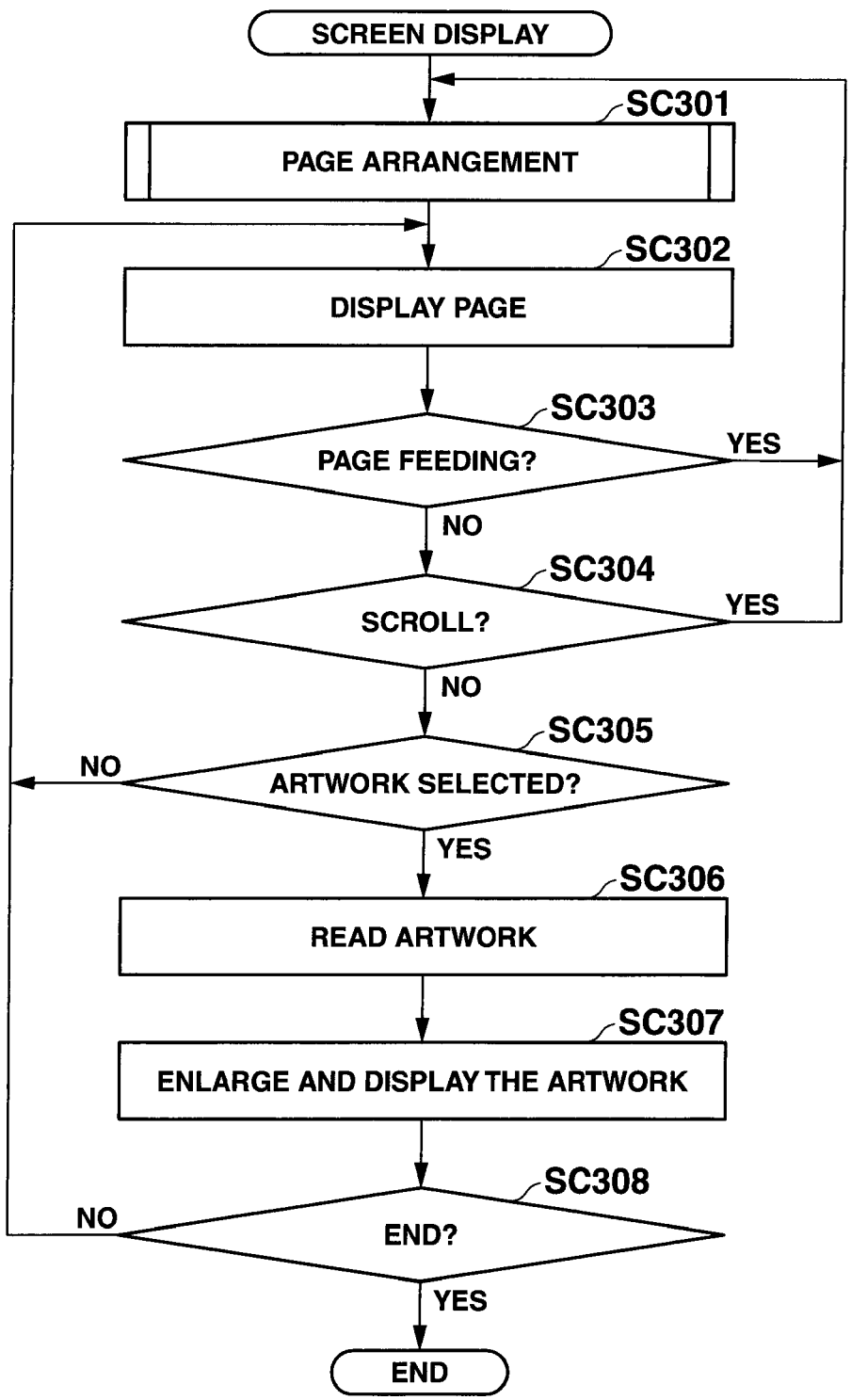
FIG. 12 is a flow chart showing screen display processing when the server displays many artworks at a glance in the first embodiment.

Next, the operation of the server 10 when artworks in the artwork area 202 are displayed at a glance will be described. FIG. 12 is a flow chart showing screen display processing performed by the CPU 20 when artworks in the artwork area 202 are displayed at a glance. The screen display processing is the processing corresponding to the display processing at a glance (SC4) in the process shown in FIG. 5 and is the processing that causes the screen of the terminal 1-1 of the user accessing the server 10 to display many artworks represented by image data.

In the screen display processing, as shown in FIG. 12, the CPU 20 first reads a plurality of artworks to be displayed from the artwork area 202 and performs page arrangement processing that arranges the image data in predetermined positions inside the display buffer 30 in a predetermined size (step SC301). Details of the page arrangement processing will be described later.

Figure 14:
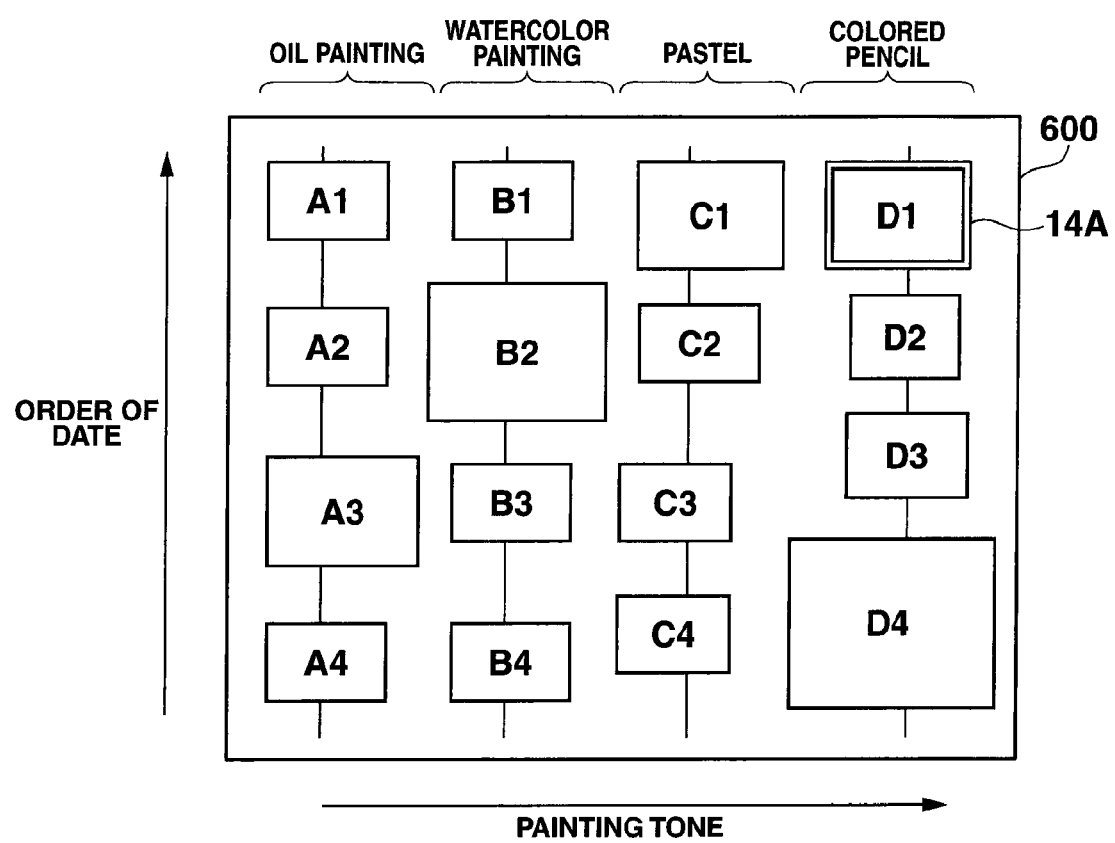
FIG. 14 is a diagram showing an example of a display screen when the server shows many artworks at a glance.

Then, the CPU 20 displays at a glance the artworks arranged in the display buffer 30 in a state shown in FIG. 14 (step SC302). In the present embodiment, as shown in FIG. 14, a plurality of artworks to be displayed is displayed on one screen in an arrangement state in which the direction of the horizontal axis is set as the type of painting tone and the direction of the vertical axis is set in order of date (the top line is the latest).

If page feeding is instructed from the user (reader) while the artworks are displayed at a glance (step SC303: YES), the CPU 20 changes the artworks being displayed in units of pages by the page arrangement processing in step SC301.

If scrolling is instructed from the user (step SC304: YES), the CPU 20 scrolls the artworks being displayed in the vertical direction or the horizontal direction by the page arrangement processing in step SC301. In the present embodiment, the scrolling directions that can be instructed by the user are both the left and right directions in the horizontal direction, but only the downward direction in the vertical direction.

Further, if one of the artworks being displayed is selected by the user while the artworks is displayed at a glance (step SC305: YES), the CPU 20 reads image data of the artwork from the artwork area 202 (step SC306) and enlarges and displays the artwork (step SC307). The present processing is processing that causes the screen of the terminal 1-1 of the user accessing the server 10 to display the artwork in the actual size.

The CPU 20 continues to display artworks at a glance by returning to step SC302 until the end of the display at a glance is instructed from the user (step SC308: NO) and when the end of the display at a glance is instructed (step SC308: YES), the CPU 20 terminates the screen display processing.

Figure 13:
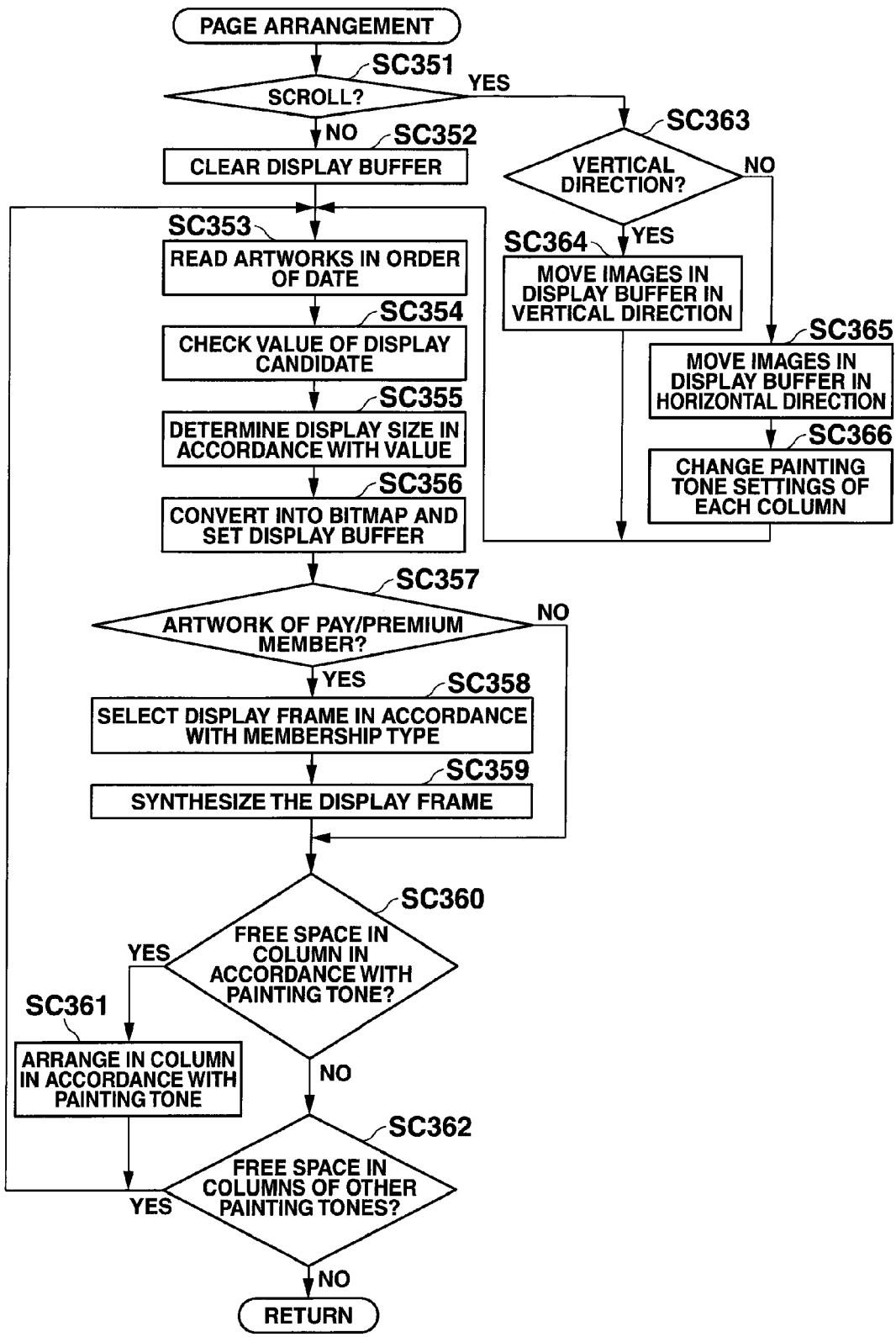
FIG. 13 is a flow chart showing page arrangement processing on the server.

Next, content of the page arrangement processing performed by the CPU 20 in step SC301 will concretely be described according to the flow chart in FIG. 13.

In the page arrangement processing, if the processing timing thereof is, for example, when the screen display processing is started or page feeding is instructed from the user and when scrolling is not instructed from the user (step SC351: NO), the CPU 20 performs the processing below.

First, the CPU 20 clears the display buffer 30 (step SC352) and then reads image data of artworks to be displayed from image data (JPEG data) of many artworks stored in the artwork area 202 into a work memory in order of date (step SC353). Incidentally, the size of artworks to be displayed may not be fixed. The work memory is a memory area for artwork secured in the memory region of the display buffer 30 separately from a memory area for display.

Next, the CPU 20 checks the value of artworks whose image data has been read (step SC354).

The value includes, as described above, the point number, access count, download count, and the membership type of the creator of each artwork which are attribute information attached to each artwork. Here, for convenience of description, the value of each artwork is defined as a point number obtained by multiplying the point number of each artwork by a multiplying factor in accordance with the membership type. The multiplying factor in accordance with the membership type is, for example, 1 if the creator of the artwork is a free member, 2 if the creator is a pay member, and 3 if the creator is a premium member.

Subsequently, the CPU 20 determines the display size of artworks in accordance with the value (step SC355). When determining the display size, the CPU 20 relatively increases the display size for an artwork with increasing value.

In the processing, for example, the minimum display size and the maximum display size used as reference are predetermined. Then, the multiplying factor proportional to the value of an artwork is determined by a predetermined formula and the display size in accordance with the value of the artwork is calculated by multiplying the minimum display size by the multiplying factor. Then, if the calculated display size is equal to or less than the maximum display size, the display size is determined as the display size of the artwork and if the calculated display size exceeds the maximum display size, the maximum display size is determined as the display size of the artwork.

For example, several display sizes such as large, medium, and small are preset and the value of artworks is also divided into several levels such as high, medium, and low to determine on the display size of each artwork corresponding to the value level of the artwork. In any case, the display size of a valuable artwork is enlarged and the display size of a less valuable artwork is reduced.

Next, the CPU 20 sets the image data read in step SC353 into the display buffer 30 as bitmap data of the display size determined as described above (step SC356). More specifically, the CPU 20 determines basic conditions for drawing the bitmap data in the display buffer 30 by the graphic accelerator 22 and sets the conditions to the graphic accelerator 22 via a driver software.

Subsequently, the CPU 20 determines whether the artwork to be displayed is an artwork of a pay member or a premium member. If the artwork to be displayed is an artwork of a free member (step SC357: NO), immediately proceeds to processing in step SC360 described later.

On the other hand, if the artwork to be displayed is an artwork of a pay member or a premium member (step SC357: YES), the CPU 20 selects the type of display frame in accordance with the membership type (step SC358). Then, the CPU 20 synthesizes the determined type of display frame into the image data to be displayed in bitmap format (step SC359).

In the present embodiment, two types of display frame, the display frame for pay members and the display frame for premium members are prepared as the display frames and one of the display frames is selected in step SC358. The display frame is intended to make artworks highlighted and is image data representing a pattern to decorate artworks like a picture frame. Moreover, the display frame for premium members is differentiated so as to cause, for example, a sense of higher quality than the display frame for pay members.

Next, the CPU 20 determines whether free space to arrange new artworks in the column in accordance with the painting tone of artworks to be displayed is available in the display buffer 30 (step SC360). In the present embodiment, as shown in FIG. 14, there are four columns to arrange artworks and the painting tones assigned to each column are the oil painting tone, watercolor painting tone, pastel tone, and colored pencil drawing tone.

Then, if free space is available in the column to which painting tone of the artworks is assigned (step SC360: YES), the CPU 20 arranges the image data of the artworks in the column (step SC361). In the processing in step SC361, if, for example, other images are present around (in the same column or adjacent columns) a location where artworks should be arranged, the CPU 20 ensures proper space between each artwork by fine-tuning positions of other images if necessary.

Then, the CPU 20 returns to the processing in step SC353 to read new artworks to be displayed.

On the other hand, if free space is not available in the column to which the painting tone of the artworks is assigned (step SC360: NO), the CPU 20 does not arrange the image data of the artworks to be displayed this time in the display buffer 30. In the processing in step SC360, if the painting tone of artworks to be displayed is different from the painting tone currently assigned to each column, the CPU 20 also determines that a free space is not available and does not arrange the image data of the artworks to be displayed this time in the display buffer 30.

Then, if the CPU 20 determines that a free space is not available, the CPU 20 subsequently determines whether a free space is available in columns to which different painting tones from the painting tone of the artworks to be displayed this time are assigned (step SC362). Then, if a free space is available in a column to which a different painting tone is assigned (step SC362: YES), the CPU 20 returns to the processing in step 353 to read new artworks to be displayed.

Subsequently, while a free space to arrange new artworks is present in any column (step SC362: YES), the CPU 20 repeats the processing in step SC353 and thereafter described above. Then, when a free space to arrange new artworks is available in none of the columns (step SC362: NO), the CPU 20 terminates the arrangement processing.

Then, a plurality of artworks arranged in the display buffer 30 by the arrangement processing is displayed at a glance on a display screen 600 of the terminal 1-1 as shown in FIG. 14 in the end by the processing in step SC302 in FIG. 12. Incidentally, FIG. 14 is a diagram showing a state in which an artwork D1 arranged in the latest position of the column of the colored pencil is an artwork of a pay member or a premium member and a display frame 14A described above is displayed around the artwork. The display frame 14A shown in FIG. 14 is for the sake of convenience and actually a display frame imitating a picture pattern of the type corresponding to the membership type of the creator of the artwork D1 is displayed.

On the other hand, separately from the above processing, if the timing of the page arrangement processing is when scrolling is instructed from the user (step SC351: YES), the CPU 20 first determines whether the scrolling direction instructed from the user is the vertical direction (downward direction) (step SC363).

If the scrolling direction is the vertical direction (step SC363: YES), the CPU 20 moves all images (artworks) arranged in the display buffer 30 in the vertical direction (step SC364). The amount of movement at this point is a preset amount of movement and is, for example, an amount that ensures space allowing one or two artworks of the minimum display size to be arranged in the top position of each column.

Then, the CPU 20 proceeds to the processing in step SC352 to perform the above processing. Accordingly, for example, the display of artwork displayed in the bottom position of the column of each painting tone is completed and instead, a new artwork is displayed in the top position.

If, in contrast to the above, the scrolling direction instructed from the user is the horizontal direction (step SC363: NO), the CPU 20 moves all images (artworks) arranged in the display buffer 30 in the horizontal direction, that is, in the left direction or right direction (step SC365). The amount of movement at this point is an amount of movement that is fixedly preset and moves artworks arranged in each column to the adjacent column. Further, the CPU 20 moves settings of the painting tone assigned to each column by one column in the same direction as the moving direction of artworks arranged in each column (step SC366).

Then, the CPU 20 proceeds to the processing in step SC353 described above to perform the above processing in a state in which the assignment of the painting tone to each column is changed. Accordingly, in the example shown in FIG. 14, instead of a group of artworks displayed in the column of the oil painting tone or the column of the colored pencil, a group of artworks of another painting tone that has not been displayed is newly displayed.

According to the present embodiment, as described above, many artworks can be displayed efficiently for the user by displaying many artworks (images) stored in the server 10 in units of pages at a glance.

The display size is increased for an artwork with increasing value to make an artwork with increasing value more highlighted. An artwork with an increasing point number is made more valuable. The value of an artwork by a premium member is set higher than the value of an artwork whose creator is a simple pay member. Moreover, a point number is automatically added to an artwork in which a face is present (can be detected) to make such an artwork more valuable than an artwork without a face.

A display frame is added to only artworks of pay members or premium members to make such artworks of pay members or premium members more highlighted than artworks of free members. Further, a display frame causing a sense of higher quality is added to artworks of premium members to make such artworks more highlighted than artworks of pay members.

Therefore, many artworks can be made to display efficiently in such a manner that user's interests are awakened. At the same time, artworks can be displayed at a glance by handling artworks with a high point number relatively more preferential than artworks with a low point number, artworks in which a face is present more preferential than artworks without a face, and artworks by premium members more preferential than artworks by pay members.

In the present embodiment, artworks by pay members or premium members are made more highlighted than artworks by free members by adding a display frame for the display at a glance, but instead of adding a display frame, for example, such artworks may be made more highlighted by showing the frame in an outer circumferential portion of artworks distinctly or blinking the frame.

Second Embodiment

Figure 15:
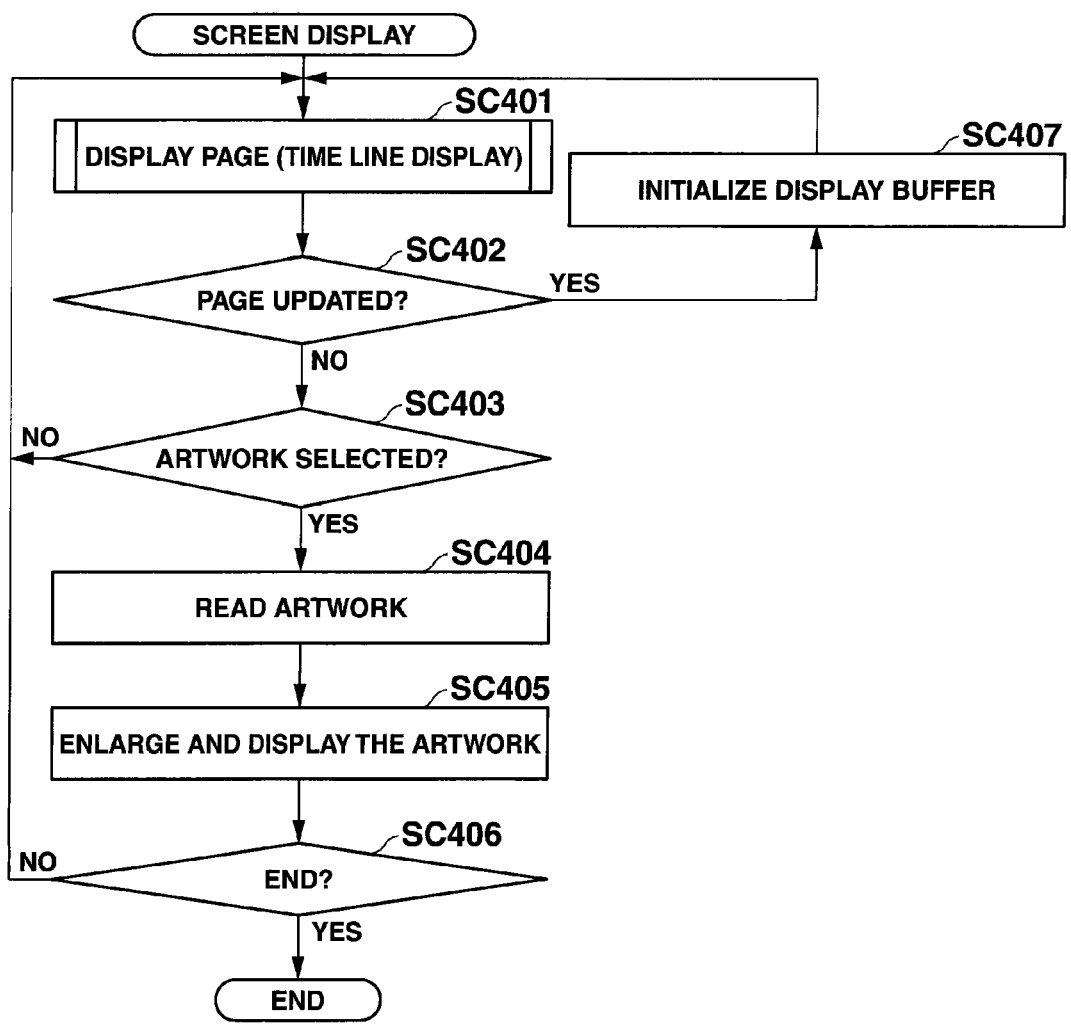
FIG. 15 is a flow chart showing image display processing when the server displays many artworks at a glance in the second embodiment.

Next, the second embodiment of the present embodiment will be described. FIG. 15 is a flow chart showing the screen display processing concerning the display of artworks when the server 10 displays many artworks at a glance on the Internet in the present embodiment.

In the screen display processing, the CPU 20 performs page processing to display at a glance image data of many artworks posted to the server 10 and stored in the artwork area 202 (step SC401). The processing in step SC401 is the display processing at a glance (SC4) in the process shown in FIG. 5 and is the processing that causes the screen of the terminal 1-1 of the user accessing the server 10 to display many artworks represented by image data.

The page display processing in step SC401 is processing that makes a time line display that causes many artworks to display like a flow over time. In the time line display in the present embodiment, as shown in FIGS. 17A to 17C, many artworks are arranged in 4 rows×4 columns in a page (one screen) and a group of artworks in each column is displayed by moving the group of artworks like a flow at a predetermined speed determined for each column downward from above (Y direction).

That is, each image of the ABCD column, EFGH column, IJKL column, and MNOP column is moved like a flow in the Y direction at mutually different speeds. Incidentally, the display space of each artwork in the time line display is fixed to a preset space.

Figure 17A:
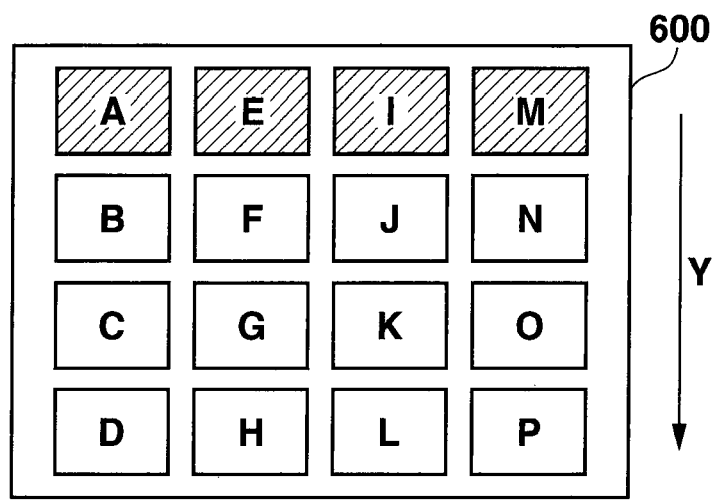
FIGS. 17A, 17B, and 17C are diagrams illustrating a time line display of a plurality of artworks by the server.
Figure 17B:
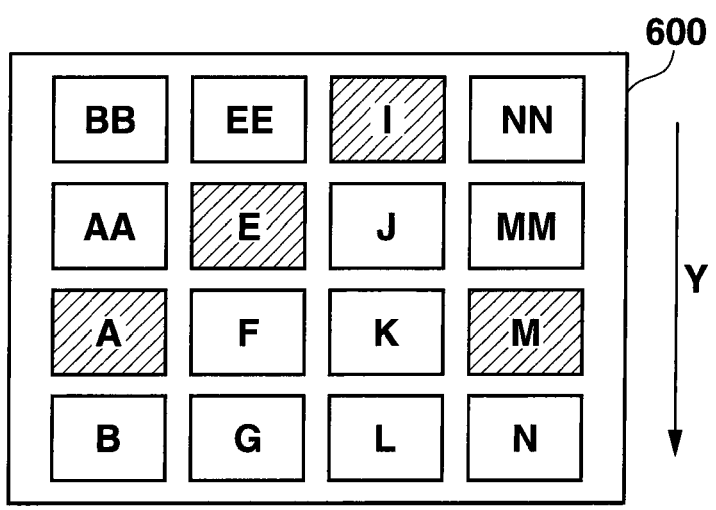
Figure 17C:
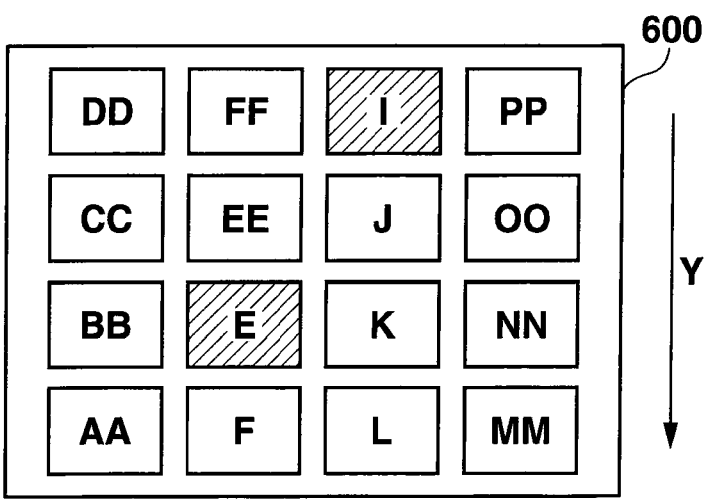

In the present embodiment, images in each column are caused to display by flowing in the Y direction at different speeds and viewing an order of FIG. 17A, FIG. 17B, and FIG. 17C in time sequence shows that, if these screens are screens, for example, every 10 seconds, the artwork A flows faster than the artwork E and the artwork I is fixed at least 30 seconds. The column of the artwork M moves in the same way as the column of the artwork A. Therefore, artworks that flow slowly like the column of the artwork E and the column of the artwork I greet the eyes of viewers longer than artworks A or M that flow fast.

Incidentally, the page display processing is repeatedly performed in predetermined processing timing until, as described later, a page update is instructed, an artwork is selected, or the end of the display at a glance is instructed by the user.

Figure 16:
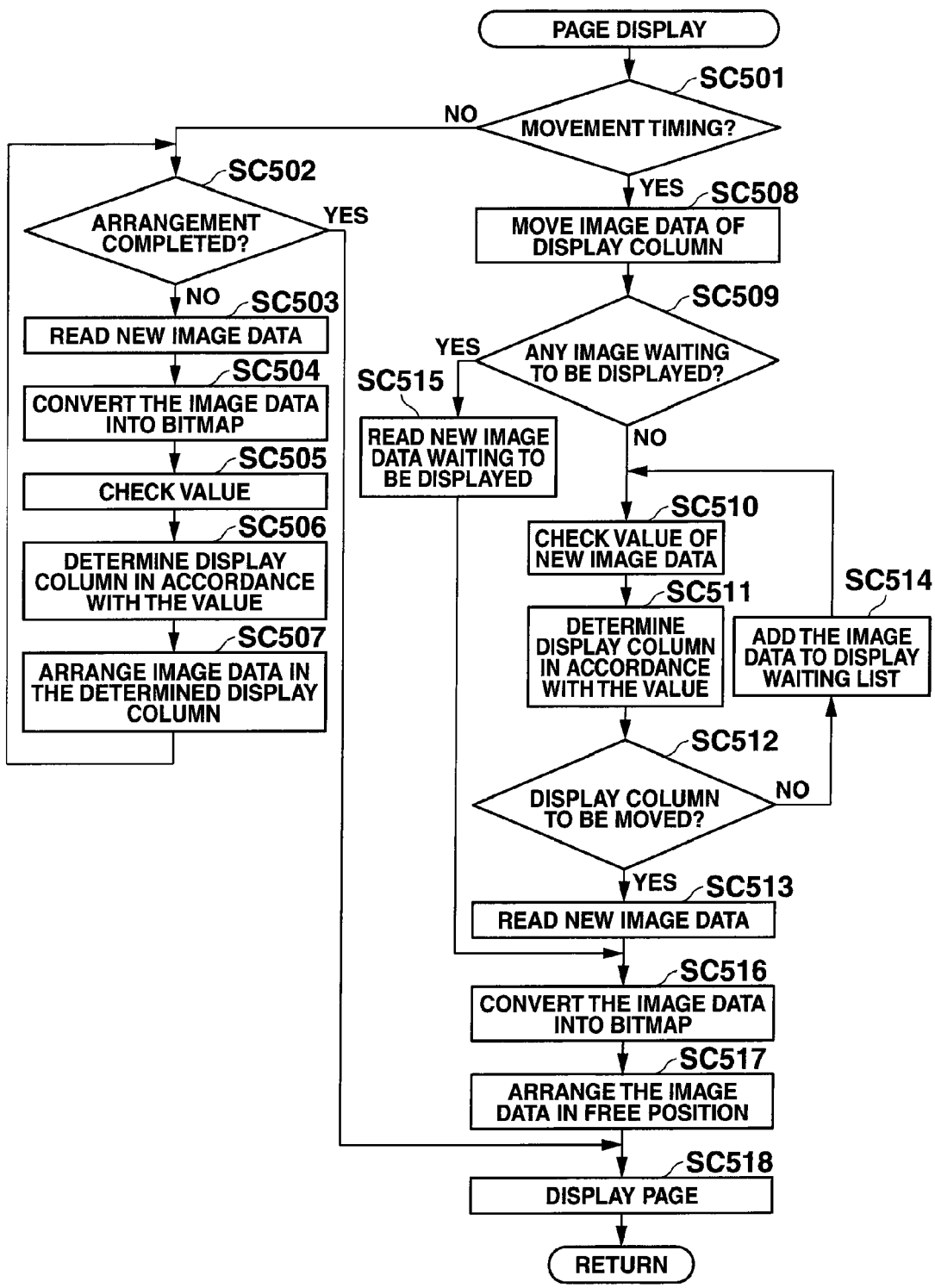
FIG. 16 is a flow chart showing page display processing on the server.

FIG. 16 is a flow chart showing content of the above page display processing. In the page display processing, the CPU 20 determines whether this processing timing is movement timing when one of columns in the page should be moved. When the processing is started, no image is displayed at a glance (step SC501: NO, step SC502: NO) and the CPU 20 reads, for example, image data to be displayed in order of date into the work memory from image data (JPEG data) of many artworks posted to the server 10 and stored in the artwork area 202 (step SC503).

Next, the CPU 20 converts the read image data into a bitmap format in the work memory (step SC504) and then checks the value of the artwork selected as an image to be displayed (step SC505). Also in this embodiment, the value of an artwork is a generic name for information that assigns weights to an artwork such as the point number, access count, download count, and membership type of the creator of each artwork which are pieces of attribute information attached to each artwork and concrete content thereof is as described in the first embodiment.

Then, the CPU 20 determines the display column in accordance with the checked value (step SC506). That is, the CPU 20 determines which column of the four columns shown in FIGS. 17A to 17C flows or displays the artwork of the image to be displayed.

In the present embodiment, the speed at which each artwork flows is preset for each column. More specifically, the first column in which the artworks A, C, and D are arranged and the fourth column in which the artworks M, N, O, and P are arranged as shown in FIG. 17A have the same speed and the fastest speed, the speed of the second column in which the artworks E, F, G, and H are arranged is the second fastest, and the speed of the third column in which the artworks I, J, K, and L are arranged is the slowest.

In step SC506, the CPU 20 first groups artworks to be displayed into three levels of the a high importance level, a medium importance level, and a low importance level in descending order of value described above.

The CPU 20 assigns the third column whose speed of flow is the slowest to artworks contained in the high-level group as the display column and the second column whose speed of flow is the second slowest to artworks contained in the medium-level group as the display column. The first column and the fourth column whose speed of flow is the fastest are alternately assigned to artworks contained in the low-level group as the display column.

Then, the CPU 20 arranges image data of artworks that are images to be displayed in bitmap format in predetermined row positions of the display column determined as described above and in which image data of other artworks is not arranged in the display buffer 30 (step SC507). At this point, new image data is successively arranged from the above row position.

Then, the CPU 20 repeats the above processing in steps SC503 to SC507 until artworks are arranged in all positions of 4 rows×4 columns in the display buffer 30. In the meantime, though not shown, if no free space is available in the display column determined in step SC 506 for any artwork that becomes an image to be displayed, the CPU 20 discards image data of the artwork and associates the corresponding image ID and information (such as the column number) indicating the determined display column. The image ID and information are added to a display waiting list described later.

When artworks are arranged in all positions of 4 rows×4 columns in the display buffer 30 (step SC502: YES), all image data in the display buffer 30, that is, images for one screen are displayed in a page (step SC518).

Accordingly, for example, as shown in FIG. 17A, 16 artworks (more accurately, reduced images of artworks) ranging from the artwork A to the artwork P are displayed on the display screen 600 of the terminal 1-1. Incidentally, the display order of artworks in each column is the order of date downward from above.

After the above page display is made once, each time the movement timing to move images of one of columns in the page comes (step SC501), the CPU 20 repeatedly performs processing in step SC508 and thereafter.

In the present embodiment, as described above, the first column (leftmost column) in which the artworks A, B, C, and D are arranged and the fourth column (rightmost column) in which the artworks M, N, O, and P are arranged as shown in FIG. 17A have the same speed and the fastest speed, the speed of the second column in which the artworks E, F, G, and H are arranged is the second fastest, and the speed of the third column in which the artworks I, J, K, and L are arranged is the slowest. Thus, the first column and the fourth column have the largest number of times to become the display column in which images should be moved hereinafter, called the display column to be moved) and the second column has the second largest number of times and the third column has the smallest number of times.

Then, when the movement timing comes, the CPU 20 moves all image data of the corresponding display column, that is, the display column to be moved downward by a row in the display buffer 30 (step SC508). Accordingly, free space is available in the top row of the display column to be moved. At this point, image data that has been in the bottom row is discarded.

Next, the CPU 20 references the display waiting list described later to determine whether there is any artwork to be displayed prior to other artworks in the display column to be moved this time. Then, if there is no artwork to be displayed (step SC509: NO), the CPU 20 checks the value of image data of the next new artwork in order of date in artworks stored in the artwork area 202 according to the same procedure as in step SC505 (step SC510) and then determines the display column of the new image data according to the same procedure as in step SC506 (step SC511).

Then, if the display column of new image data is to be moved this time, that is, free space is available in the display column of the new image data (step SC512: YES), the CPU 20 reads the new image data from the artwork area 202 (step SC513).

Next, the CPU 20 converts the read image data into bitmap data (step SC516) and arranges the bitmap data in a free position in the display buffer 30, that is, in the top row of the display column to be moved (step SC517) and then makes a page display of all image data after the update in the display buffer 30. That is, an image for a new screen that has changed to a state in which three existing artworks of the display column to be moved have moved downward by one row (step SC518).

On the other hand, if, in step SC512, the display column of new image data is not to be moved this time, that is, free space is not available in the display column of the new image data (step SC512: NO), the CPU 20 adds the image data to the display waiting list (step SC514). The display waiting list is a list provided in an internal memory of the CPU 20 and, more specifically, table data that associates and stores the image ID and information (such as the column number) indicating the display column determined for the image (artwork) indicated by the image ID.

After adding new image data to the display waiting list in step SC514, the CPU 20 returns to step SC510 to check the value of image data of the next new artwork in order of date in artworks stored in the artwork area 202 again. Then, the CPU 20 repeats the above processing and then, if the display column for the new image data matches the display column to be moved this time (step SC512: YES), the CPU 20 displays a new page in which the image data, that is, the new artwork is arranged in the top row of the display column to be moved this time (steps SC513 to SC518).

Then, if the display waiting list stores information about image data for which the display column matching the display column to be moved is associated at any movement timing (step SC509: YES), the CPU 20 reads the image data, that is, new image data waiting to be displayed as an image to be displayed from the artwork area 202 (step SC515). At this point, information about the new image data is deleted from the display waiting list. Then, the CPU 20 displays a new page in which the new image data (artwork) is arranged in the top row of the display column to be moved this time (steps SC516 to SC518).

Subsequently, each time the movement timing comes, the CPU 20 repeats the processing of steps SC508 to SC518 described above. Accordingly, many artworks posted to the server 10 and stored in the artwork area 202 are arranged in the column in accordance with the value of each artwork is displayed like a flow at the speed determined for each column.

Then, in the screen display processing, as shown in FIG. 15, if the page update is instructed from the user (step SC402: YES) while the above page display is made, the CPU 20 initializes the display buffer 30 at this point (step SC407) and then makes the page display described above (step SC401). At this point, a new page is displayed by undergoing the processing in steps SC502 to SC507 in FIG. 16. That is, a page in which new 16 artworks that were not displayed immediately before are displayed at a glance is displayed immediately after the page update is instructed and then, a new time line display is started.

Subsequently, if one of artworks is selected by a user in the page being displayed while the above page display is made (step SC403: YES), the CPU 20 reads the image data of the artwork from the artwork area 202 (step SC404) and enlarges and displays the image data (step SC405). The enlargement processing causes the screen of the terminal 1-1 of the user accessing the server 10 to display an artwork in the actual size.

Then, on the server 10, the CPU 20 returns to step SC401 to continue to make the page display of many artworks until the user instructs the end of the display at a glance (step SC406: NO). Then, when the end of the display at a glance is instructed (step SC406: YES), the CPU 20 terminates the screen display processing.

According to the present embodiment, as described above, many artworks can be displayed efficiently for the user by displaying many artworks (images) stored in the server 10 in units of pages at a glance. At the same time, when many artworks are displayed at a glance, many artworks can be made to display in such a way that user's interests are awakened by making the above time line display thereof.

Moreover, in the time line display according to the present embodiment, each artwork is displayed in a moving state like a flow and the speed of the flow (movement) of each artwork is changed in accordance with the value of each artwork. Therefore, the flow of each artwork can be changed so that many artworks can be displayed so as to awaken users' interests still more.

Also in the time line display according to the present embodiment, the speed of the flow (movement) of an artwork with increasing value is made slower so that an artwork with increasing value is made easier to view and the display time thereof is made longer. The value of an artwork is increased with an increasing point number of the artwork and the value of an artwork by a premium member is set higher than the value of an artwork whose creator is a simple pay member. Moreover, a point number is automatically added to an artwork in which a face is present (can be detected) to make such an artwork more valuable than an artwork without a face.

Therefore, artworks can be displayed at a glance by handling artworks with a high point number relatively more preferential than artworks with a low point number, artworks in which a face is present more preferential than artworks without a face, and artworks by premium members more preferential than artworks by pay members.

In the present embodiment, a plurality of artworks in a page is made to display like a flow in the vertical direction (Y direction) for the time line display, but the present invention is not limited to this example and artworks may naturally be caused to display like a flow in the horizontal direction (X direction) or in a slanting direction. For the sake of convenience, the arrangement of artworks in a page is assumed to have 4 rows×4 columns in the present embodiment, but the number of artworks in each column and each row is arbitrary.

Also in the present embodiment, the value of each artwork is assumed to be determined based on the point number of the artwork and the membership type of the creator of the artwork. However, the value of each artwork may be determined as follows. The value of each artwork may be determined based on, for example, one piece of attribute information of the point number, access count (browsing count), and download count, any plurality of pieces of attribute information, or the membership type of the creator of each artwork only. Alternatively, the value of each artwork may be determined based on the attribute information excluding the membership type of the creator of the artwork and the download count, or based on the membership type of the creator of the artwork and a plurality of pieces of attribute information.

Also in the present embodiment, the time line display of each artwork is made basically in order of date, but the time line display of each artwork may be made randomly. The moving speed of artworks in each column may be set randomly without fixing the speed under the condition that at least the same moving speed is not set to columns of artworks having different values.

Also in the present embodiment, the length of time in which artworks greet the eyes of users is controlled by changing the moving speed depending on the value of each column of artworks, but, instead of moving artworks, artworks may be displayed in the same position while changing the timing to switch to the next image, that is, the display duration. In FIGS. 17A to 17C, for example, each artwork moves at a different speed from column to column, but the artwork A may be replaced in the same position by the next artwork AA after 15 seconds, the artwork E may be replaced in the same position by the next artwork EE after 30 seconds, and the artwork I may be replaced in the same position by the next artwork II after 1 minute.

Also in the present embodiment, the CPU 20 makes the above time line display for all artworks posted to the server 10 and stored in the artwork area 202 when performing screen display processing. However, artworks to be displayed in the time line display may be limited to artworks having specific painting tones.

Figure 18:
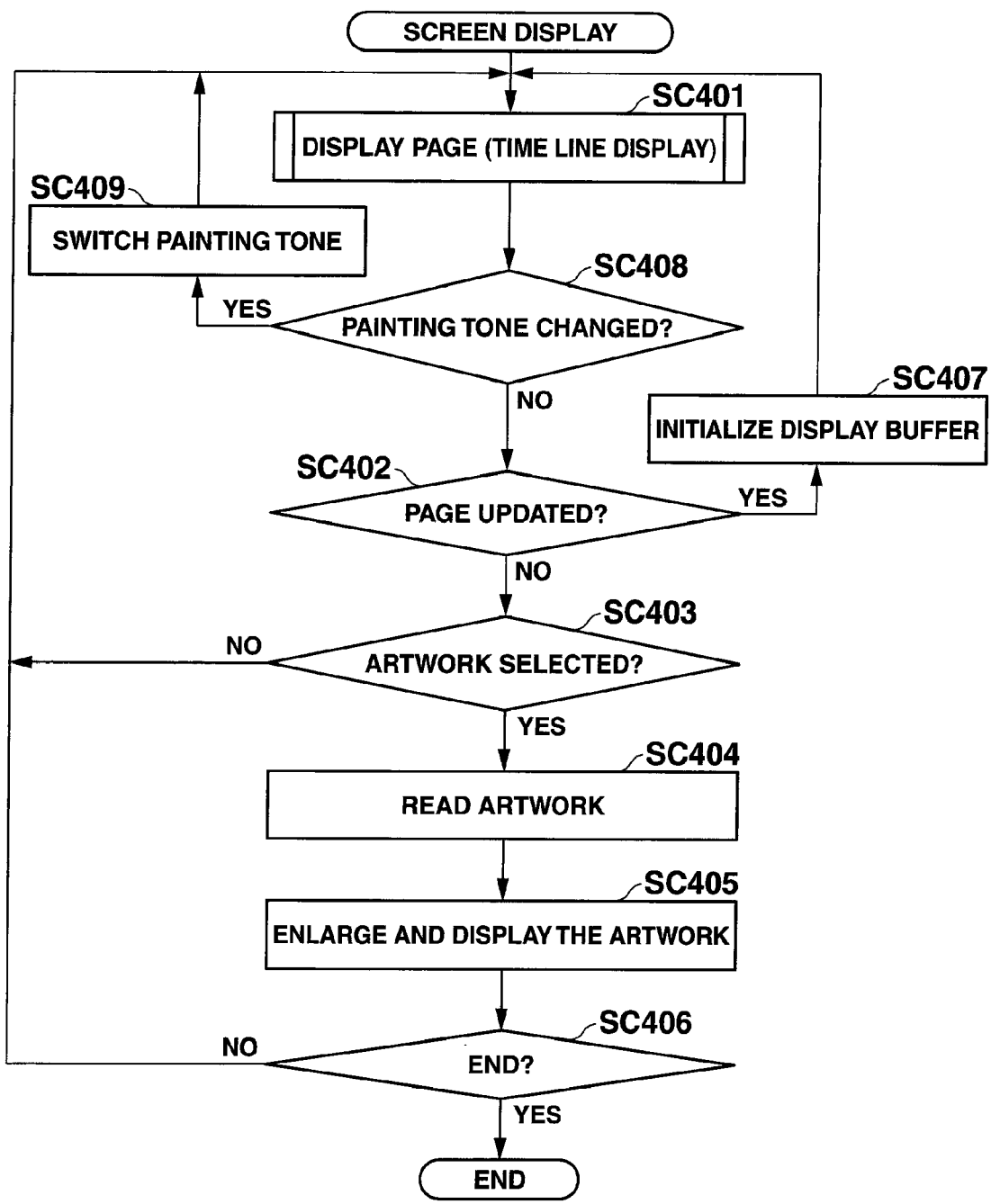
FIG. 18 is a flow chart showing a modification of the second embodiment.

FIG. 18 is a flow chart showing a modification of the screen display processing in that case and corresponding to FIG. 15. When artworks to be displayed are limited to artworks having specific painting tones, as shown in FIGS. 17A to 17C, if the user instructs to change the painting tone while the time line display of a plurality of artworks intended for artworks of an optional painting tone is made (step SC408: YES), the above page display processing may be performed after the painting tone of artworks to be displayed being switched in a predetermined order (step 409).

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:
1. An image display apparatus comprising:
a memory which stores a plurality of images;
an evaluation unit which evaluates the plurality of images stored in the memory to assign a value to each of the stored plurality of images;

a grouping unit which classifies the stored plurality of images into a high-value group and a low-value group in accordance with the values assigned by the evaluation unit;

an image arrangement controller which arranges a predetermined number of images selected from among the stored plurality of images on a screen in a row direction and in a column direction, wherein columns in which the predetermined number of images are arranged respectively correspond to values such that images classified into the high-value group are arranged in a column corresponding to a high value, and images classified into the low-value group are arranged in a column corresponding to a low value;

a first display controller which displays the arranged images while simultaneously moving the arranged images in the column direction; and a second display controller which controls moving speeds of the arranged images on the screen such that the images arranged in the column corresponding to the high value move slowly compared with the images arranged in the column corresponding to the low value.

2. The image display apparatus according to claim 1, further comprising a resizing unit which resizes the stored plurality of images before the images are displayed on the screen.

3. The image display apparatus according to claim 1, wherein the second display controller randomly determines the moving speeds of the arranged images in the column direction such that moving speeds of the images arranged in the columns corresponding to the high value and the low value are not equal.

4. An image display method for a computer of an image display apparatus comprising a memory in which a plurality of images are stored, the method comprising:

evaluating the plurality of images stored in the memory to assign a value to each of the stored plurality of images;

classifying the stored plurality of images into a high-value group and a low-value group in accordance with the assigned values;

arranging a predetermined number of images selected from among the stored plurality of images on a screen in a row direction and in a column direction, wherein columns in which the predetermined number of images are arranged respectively correspond to values such that images classified into the high-value group are arranged in a column corresponding to a high value, and images classified into the low-value group are arranged in a column corresponding to a low value;

displaying the arranged images while simultaneously moving the arranged images in the column direction; and controlling moving speeds of the arranged images on the screen such that the images arranged in the column corresponding to the high value move slowly compared with the images arranged in the column corresponding to the low value.

5. A non-transitory computer-readable recording medium having stored thereon a program for controlling a computer of an image display apparatus comprising a memory which stores a plurality of images, the program causing the computer to perform functions comprising:

evaluating the plurality of images stored in the memory to assign a value to each of the stored plurality of images;

classifying the stored plurality of images into a high-value group and a low-value group in accordance with the assigned values;

arranging a predetermined number of images selected from among the stored plurality of images on a screen in a row direction and in a column direction, wherein columns in which the predetermined number of images are arranged respectively correspond to values such that images classified into the high-value group are arranged in a column corresponding to a high value, and images classified into the low-value group are arranged in a column corresponding to a low value;

displaying the arranged images while simultaneously moving the arranged images in the column direction; and controlling moving speeds of the arranged images on the screen such that the images arranged in the column corresponding to the high value move slowly compared with the images arranged in the column corresponding to the low value.

6. An image display system which comprises a server, an upload unit which is connectable to a plurality of user terminals and which uploads a plurality of images from the plurality of user terminals to the server over a network, and a memory which stores the plurality of images uploaded from the plurality of user terminals, the system further comprising:

an evaluation unit which evaluates the plurality of images stored in the memory to assign a value to each of the stored plurality of images;

a grouping unit which classifies the stored plurality of images into a high-value group and a low-value group in accordance with values assigned by the evaluation unit;

an image arrangement controller which arranges a predetermined number of images selected from among the stored plurality of images on a screen in a row direction and in a column direction, wherein columns in which the predetermined number of images are arranged respectively correspond to values such that images classified into the high-value group are arranged in a column corresponding to a high value, and images classified into the low-value group are arranged in a column corresponding to a low value;

a first display controller which displays the arranged images while simultaneously moving the arranged images in the column direction; and a second display controller which controls moving speeds of the arranged images on the screen such that the images arranged in the column corresponding to the high value move slowly compared with the images arranged in the column corresponding to the low value.

* * * * *